(12) United States Patent
Nakagawa

(10) Patent No.: US 8,970,865 B2
(45) Date of Patent: Mar. 3, 2015

(54) PRINTING CONTROL DEVICE, STORAGE MEDIUM STORING PRINTING CONTROL PROGRAM, AND PRINTING CONTROL METHOD

(75) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/565,382

(22) Filed: Aug. 2, 2012

(65) Prior Publication Data

US 2013/0033714 A1 Feb. 7, 2013

(30) Foreign Application Priority Data

Aug. 4, 2011 (JP) .................................. 2011-171249
Oct. 13, 2011 (JP) .................................. 2011-225543

(51) Int. Cl.
  *G06F 3/12* (2006.01)
  *G06K 15/00* (2006.01)
  *H04N 1/393* (2006.01)

(52) U.S. Cl.
  CPC ............ *G06F 3/1205* (2013.01); *G06F 3/1232* (2013.01); *G06F 3/1254* (2013.01); *G06F 3/1244* (2013.01); *H04N 1/3935* (2013.01); *G06F 3/1258* (2013.01); *G06F 3/1288* (2013.01)
  USPC ........... 358/1.14; 358/1.1; 358/1.2; 358/1.13; 358/1.15

(58) Field of Classification Search
  USPC .................................. 358/1.1–1.18
  See application file for complete search history.

(56) References Cited

U.S. PATENT DOCUMENTS

| | | | | |
|---|---|---|---|---|
| 5,025,325 | A * | 6/1991 | Hudson | 358/447 |
| 5,745,659 | A * | 4/1998 | Rigau Rigau et al. | 358/1.2 |
| 6,377,354 | B1 * | 4/2002 | Nguyen et al. | 358/1.11 |
| 6,865,354 | B2 * | 3/2005 | Jackelen et al. | 399/81 |
| 7,054,016 | B2 * | 5/2006 | Nagata | 358/1.13 |
| 7,720,926 | B2 * | 5/2010 | Asahara | 709/207 |
| 8,614,812 | B2 * | 12/2013 | Huh et al. | 358/1.15 |
| 2005/0243355 | A1 * | 11/2005 | Foehr et al. | 358/1.13 |
| 2005/0270553 | A1 * | 12/2005 | Kawara | 358/1.13 |
| 2006/0017955 | A1 * | 1/2006 | Owen et al. | 358/1.13 |
| 2006/0023230 | A1 * | 2/2006 | Nakata | 358/1.6 |
| 2007/0220475 | A1 * | 9/2007 | Asahara | 716/17 |
| 2008/0266598 | A1 * | 10/2008 | Ozaki | 358/1.15 |
| 2010/0053668 | A1 * | 3/2010 | Huh et al. | 358/1.15 |
| 2010/0238494 | A1 * | 9/2010 | Araki | 358/1.15 |
| 2012/0033251 | A1 * | 2/2012 | Okada et al. | 358/1.15 |
| 2012/0081742 | A1 * | 4/2012 | Yamada | 358/1.15 |

FOREIGN PATENT DOCUMENTS

| | | |
|---|---|---|
| JP | 4033857 B | 1/2008 |
| JP | 4119868 B | 7/2008 |

* cited by examiner

*Primary Examiner* — Richard Zhu
(74) *Attorney, Agent, or Firm* — Canon USA, Inc., IP Division

(57) ABSTRACT

The printing control device of the present invention inquires whether or not an actual output printer driver supports the function of the items regarding drawing processing in step SC1503. If it is found as a result of inquiry in step SC1504 that the printer driver does not support the function, the printing control device processes print data in step SC1506. On the other hand, if the printer driver supports the function in step SC1504, the printing control device determines whether or not the print setting corresponding to the function is enabled in step SC1505. If the printing control device determines that the print setting is disabled, the process advances to step SC1506 and the printing control device processes print data.

11 Claims, 22 Drawing Sheets

FIG. 5A

| Symbol in Fig. 4 | Transmission source | Transmission destination | Transmission data |
|---|---|---|---|
| 1-1 | Client application 400 | Virtual printer driver 401 | DDI |
| 1-2 | Virtual printer driver 401 | Print processor 402 | EMFSPOOL |
| 1-3 | Print processor 402 | Job management service 403 | EMFSPOOL<br>GUID<br>Job name<br>User name<br>DEVMODE<br>Logical printer name of virtual printer driver |
| 1-4 | Job management service 403 | Job management DB 404 | EMFSPOOL file path<br>GUID<br>Job name<br>User name<br>DEVMODE<br>Logical printer name of virtual printer driver<br>User token<br>Date &Time |
| 1-5 | Job management service 403 | Address management service 405 | GUID<br>User name |
| 1-6 | Address management service 405 | Address management DB 406 | GUID<br>User name<br>IP address |
| 2-1 | Panel application 407 | Address management service 405 | User name |
| 2-2 | Address management DB 406 | Address management service 405 | IP address |
| 2-3 | Address management service 405 | Panel application 407 | IP address |
| 2-4 | Panel application 407 | Job management service 403 | User name |
| 2-5 | Job management DB 404 | Job management service 403 | GUID<br>Job name<br>DEVMODE<br>Logical printer name of virtual printer driver<br>User token<br>Date &Time |
| 2-6 | Job management service 403 | Panel application 407 | GUID<br>Job name<br>Copy count<br>Duplexing<br>Color mode<br>Pages per sheet<br>Date &Time |

FIG. 5B

| Symbol in Fig. 4 | Transmission source | Transmission destination | Transmission data |
|---|---|---|---|
| 3-1 | Panel application 407 | Job management service 403 | GUID |
|  |  |  | Copy count |
|  |  |  | Duplexing |
|  |  |  | Color mode |
|  |  |  | Pages per sheet |
|  |  |  | Model name of multi-function peripheral |
| 3-2 | Job management DB 404 | Job management service 403 | DEVMODE |
| 3-3 | Job management service 403 | Panel application 407 | GUID |
|  |  |  | Copy count |
|  |  |  | Duplexing |
|  |  |  | Color mode |
|  |  |  | Pages per sheet |
| 4-1 | Panel application 407 | Job management service 403 | GUID |
|  |  |  | Model name of multi-function peripheral |
| 4-2 | Job management DB 404 | Job management service 403 | EMFSPOOL file path |
|  |  |  | DEVMODE |
|  |  |  | User token |
| 4-3 | Job management service 403 | Printer driver 408 | DEVMODE |
|  |  |  | Drawing processing function to be inquired |
| 4-4 | Printer driver 408 | Job management service 403 | Inquiry result |
| 4-6 | Job management service 403 | Printer driver 408 | EMFSPOOL |
|  |  |  | DEVMODE |
| 4-7 | Printer driver 408 | Multi-function peripheral 102 | PDL job data |
| 5-1 | Panel application 407 | Job management service 403 | GUID |
| 5-2 | Job management service 403 | Address management service 405 | GUID |
| 5-3 | Address management service 405 | Address management DB 406 |  |
| 5-4 | Job management service 403 | Job management DB 404 |  |

FIG. 13A

```
<?xml version="1.0" encoding="utf-8"?>
<JobInfo
    Guid="{93DEBE22-682C-4806-AC24-CC8A4589A26F}"
    JobName="Statement of accounts"
    UserName="Taro Yamada"
    PrintQueueName="Print anywhere"
    >
    <DocumentSettings
        DevmodeSnapshot="QwBhAG4AbwBuACAAaQB..."
    />
</JobInfo>
```

FIG. 13B

```xml
<?xml version="1.0" encoding="utf-8"?>
<JobList>
    <JobInfo Guid="{83DEBE22-682C-4806-AC24-CC8A4588A26F}" JobName="Statement of accounts">
        <DocumentSettings
            CopyCount="1"
            Duplexing="OneSided"
            OutputColor="Color"
            PagesPerSheet="1"
            DateTime="2010-1-14T10:19:00+09:00"
        />
    </JobInfo>
    <JobInfo Guid="{D00AE377-4771-41c4-9A30-46BB3955367F}" JobName="Estimate">
        <DocumentSettings
            CopyCount="5"
            Duplexing="OneSided"
            OutputColor="Monochrome"
            PagesPerSheet="1"
            DateTime="2010-1-14T10:19:00+09:00"
        />
    </JobInfo>
    <JobInfo Guid="{12258253-36CF-4896-8039-82627ADACB9A}" JobName="Application for leave of absence">
        <DocumentSettings
            CopyCount="1"
            Duplexing="TwoSidedLongEdge"
            OutputColor="Monochrome"
            PagesPerSheet="1"
            DateTime="2010-1-14T10:19:00+09:00"
        />
    </JobInfo>
    <JobInfo Guid="{08DF859D-09F8-4619-A867-CD9533086083}" JobName="Project proposal">
        <DocumentSettings
            CopyCount="1"
            Duplexing="OneSided"
            OutputColor="Color"
            PagesPerSheet="1"
            DateTime="2010-1-14T10:20:00+09:00"
        />
    </JobInfo>
    <JobInfo Guid="{586B8D3F-9CDC-4f9c-A642-B5087FF357E6}" JobName="1111111111222222222233333333334444444444">
        <DocumentSettings
            CopyCount="1"
            Duplexing="OneSided"
            OutputColor="Monochrome"
            PagesPerSheet="1"
            DateTime="2010-1-14T10:20:00+09:00"
        />
    </JobInfo>
    <JobInfo Guid="{985908C2-D27E-479d-89F5-E02A41715817}" JobName="abcdefghijklmn">
        <DocumentSettings
            CopyCount="1"
            Duplexing="OneSided"
            OutputColor="Monochrome"
            PagesPerSheet="1"
            DateTime="2010-1-14T10:21:00+09:00"
        />
    </JobInfo>
    <JobInfo Guid="{050AE3B0-5D19-4036-B3CE-FD5FA0FB000C}" JobName="Meeting material">
        <DocumentSettings
            CopyCount="1"
            Duplexing="OneSided"
            OutputColor="Color"
            PagesPerSheet="2"
            DateTime="2010-1-14T10:21:00+09:00"
        />
    </JobInfo>
</JobList>
```

FIG. 13C

```
<?xml version="1.0" encoding="utf-8"?>
<JobInfo
    Guid="{93DEBE22-682C-4806-AC24-CC8A4589A26F}"
    DeviceModelName="Cxxxx ix6000"
    >
        <DocumentSettings
            CopyCount="1"
            Duplexing="TwoSidedLongEdge"
            OutputColor="Color"
            PagesPerSheet="1"
        />
</JobInfo>
```

FIG. 13D

```
<?xml version="1.0" encoding="utf-8"?>
<JobInfo Guid="{93DEBE22-682C-4806-AC24-CC8A4589A26F}">
    <DocumentSettings
        CopyCount="1"
        Duplexing="OneSided"
        OutputColor="Color"
        PagesPerSheet="1"
    />
</JobInfo>
```

FIG. 14C

Print anywhere

Taro Yamada

| Document name | Color mode | Duplexing | Pages per sheet | Copy count | Date & Time |
|---|---|---|---|---|---|
| ■ Statement of accounts | Color | One-sided | 1 in 1 | 1 copy | 01/14 10:19 |
| ☐ Estimate | Monochrome | One-sided | 1 in 1 | 5 copies | 01/14 10:19 |
| ☐ Application for leave of absence | Monochrome | Two-sided | 1 in 1 | 1 copy | 01/14 10:19 |
| ☐ Project proposal | Color | One-sided | 1 in 1 | 1 copy | 01/14 10:20 |
| ☐ 1111111112222222222333333333344444444444 | Monochrome | One-sided | 1 in 1 | 1 copy | 01/14 10:20 |
| ☐ abcdefghijklmn | Monochrome | One-sided | 1 in 1 | 1 copy | 01/14 10:21 |
| ☐ Meeting material | Color | One-sided | 2 in 1 | 1 copy | 01/14 10:21 |

Update

Document count
7

1/1

Select all | Cancel selection | Erase — 1421

Print — 1422

Log out

PRINTING CONTROL DEVICE, STORAGE MEDIUM STORING PRINTING CONTROL PROGRAM, AND PRINTING CONTROL METHOD

BACKGROUND OF THE INVENTION

1. Field of the Invention

The present invention relates to a printing control device, a storage medium storing a printing control program, and a printing control method.

2. Description of the Related Art

There has conventionally been proposed a so-called "pull print" printing system capable of outputting print data from a printing apparatus when a user issues a print request to the printing apparatus for print data temporarily stored in a server (see Japanese Patent No. 4033857). According to the pull print printing system, when printing is executed from an application, a user can output print data not from a specific printing apparatus but from a printing apparatus of his choice. Also, in the pull print printing system, a printer driver running on a client generates print data and transmits the generated print data to a server.

In addition to the pull print printing system, there has also been proposed the following system in a printing environment where different printer drivers are used in a client/server environment. In the printing system, a printer driver running on a client transfers a spool file, to which print setting information required on a server is appended, to the server. A spool association unit on the server that has received the spool file looks up print setting information appended to the spool file and reflects the information to print data (see Japanese Patent No. 4119868).

In the conventional printing system, it is difficult to indicate a change in print setting information when a print request for print data temporarily stored in a server is made from a printing apparatus by a user. Since the format of print data to be temporarily stored in a server is a PDL (Page Description Language) that depends on a printing apparatus, the PDL must be edited as directed by a print setting change. Unfortunately, it is difficult to perform such editing.

Specific examples are provided below. Assume that a user provides instructions about print setting information (hereinafter referred to as "4 in 1") so as to assign four pages to one page when a print request for print data temporarily stored in a server is made from a printing apparatus by the user. At this time, print data to be temporarily stored in a server, i.e., PDL needs to be changed so as to be compatible with 4 in 1. If PDL is in a raster format which depends on the resolution of a printing apparatus, a raster image needs to be compressed so as to realize 4 in 1, resulting in the occurrence of various quality deficiencies such as vanishing of thin lines or the like.

Since there are a wide variety of PDL specifications, a considerable effort is required for a printing apparatus to be compatible with a plurality of PDLs. If the specifications of PDL have been set to private, PDL cannot even be changed. Furthermore, the fact that PDL cannot be changed may lead to restriction of the type(s) of a printing apparatus(s) when a user provides instructions for storing print data in a server. Consequently, the type(s) of a printing apparatus(s) cannot be freely changed during pull printing.

In order to overcome such difficulties, a printing system is desired such that data can be re-edited on a server. However, the print function specified by a user via a printer driver running on a client is not necessarily supported by a printer driver on a server. An example of such a print function is the function of expanding/reducing an original paper size set by an application installed in a client in accordance with a sheet placed on an actual output printer.

If the function is supported by a printer driver on a server, print data can be printed out without any problems upon transmission of print data to the printer driver on the server, whereas if the function is not supported thereby, print data is output in its original paper size without being subjected to expansion/reduction print processing. Even if the expansion/reduction print function itself is supported, a sheet to be expanded/reduced may vary for each printer driver. Thus, if such a sheet is not supported, the print result as expected may still not be obtained.

SUMMARY OF THE INVENTION

The present invention provides a printing control device that can perform pull printing in the case of print processing in which drawing processing for print data itself is required, such as an expansion/reduction print function, a color/monochrome print function, a page integration function, and the like among appropriate print functions wished by a user.

The printing control device of the present invention is a device that transmits print data, wherein print settings are reflected in the print data, to a driver, and includes a function determining unit configured to determine whether or not the driver supports a predetermined function among the print settings; and a processing unit configured to process the print data with respect to the function if the function determining unit determines that the driver does not support the function.

According to the present invention, the print result may be provided in accordance with the content set on a client PC by a user.

Further features of the present invention will become apparent from the following description of exemplary embodiments with reference to the attached drawings.

BRIEF DESCRIPTION OF THE DRAWINGS

FIGS. 5A and 5B are tables showing the details of each data flow.

FIG. 13A is a diagram illustrating the details of data flowing between step SB703 and step SC701 shown in FIG. 7.

FIG. 13B is a diagram illustrating the details of data flowing between step SC809 and step SE811 shown in FIG. 8.

FIG. 13C is a diagram illustrating the details of data flowing between step SE905 and step SC901 shown in FIG. 9.

FIG. 13D is a diagram illustrating the details of data flowing between step SC910 and step SE906 shown in FIG. 9.

FIG. 14C is a schematic diagram illustrating a screen to be displayed on a display unit of an operation unit provided in a multi-function peripheral.

DESCRIPTION OF THE EMBODIMENTS

Hereinafter, preferred embodiments of the present invention will now be described in detail with reference to the accompanying drawings.

First Embodiment

Figure 1:
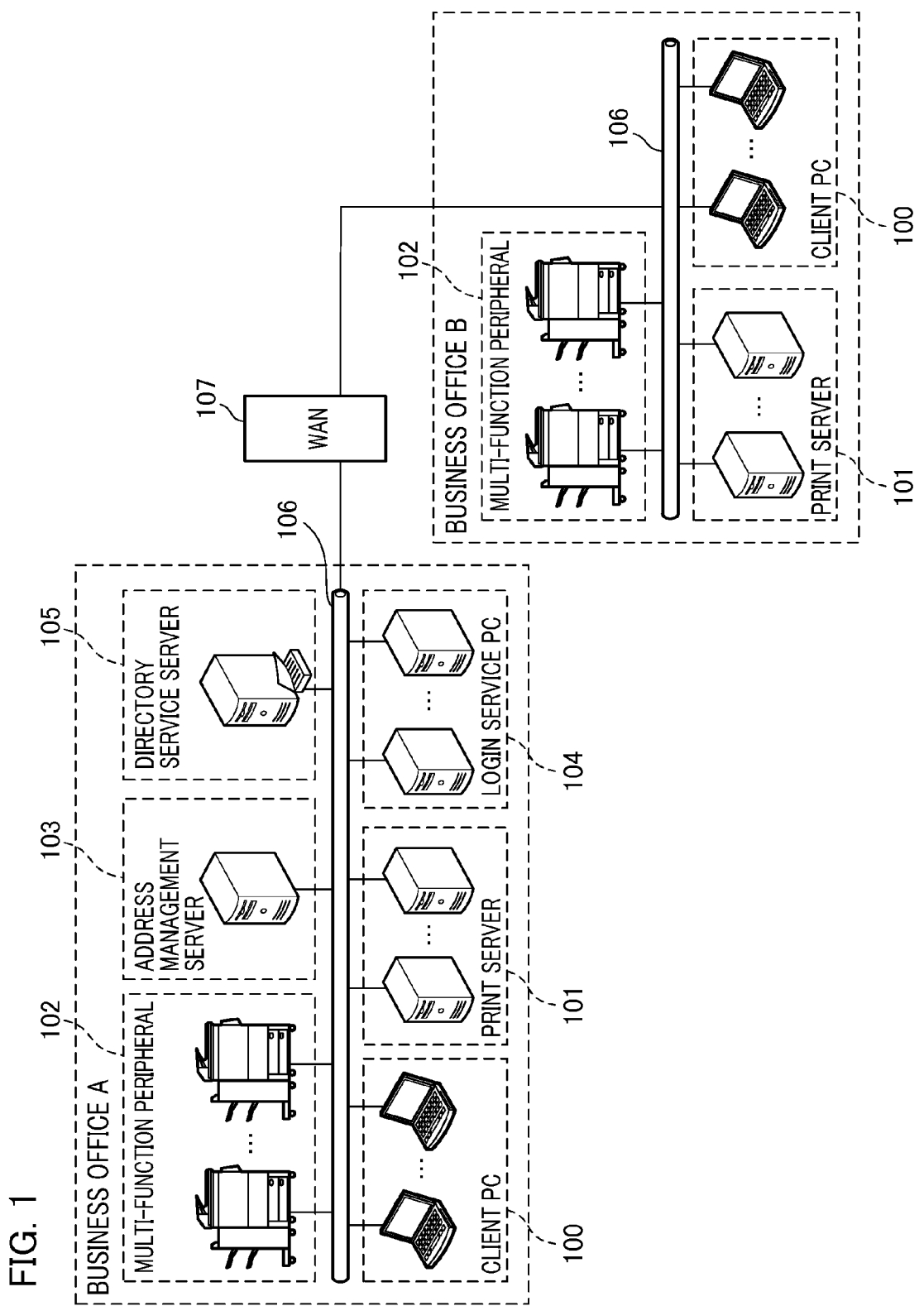
FIG. 1 is a diagram illustrating an example of the configuration of a system according to the present embodiment.

FIG. 1 is a diagram illustrating an example of the configuration of a system including a client PC, a print server (printing control device), an address management server, and a printing apparatus. As shown in a "business office A" in FIG. 1, the printing system of the present embodiment includes one or a plurality of client PCs 100, one or a plurality of print servers 101, and one or a plurality of multi-function peripherals 102. As an example, the client PCs 100 are assigned to each user, the print servers 101 are provided for each floor of the business office A, and the multi-function peripherals 102 are provided for each floor of the business office A. Furthermore, an address management server 103, one or a plurality of login service PCs 104 (e.g., provided for each floor), and a directory service server 105 are connected to each other via a local area network (LAN) 106.

A virtual printer driver is installed in the client PC 100. The virtual printer driver generates a print job in an intermediate format independent of a specific multi-function peripheral based on data received from a client application and transmits the generated print job to the print server 101. Note that a print job in an intermediate format means data in a format of which specification is open to the public and is readily reedited. Examples of such format include EMFSPOOL format (Enhanced Metafile Spool Format), XPS (XML Paper Specification), and the like. In the present embodiment, a description will be given using the EMFSPOOL format, but a print job in another intermediate format such as XPS or PDF may also be available.

The print server 101 stores the received print job in a predetermined storage location. Also, the print server 101 includes a job management database (hereinafter referred to as "job management DB"), and stores metadata regarding a print job in the job management DB for management. The print server 101 generates print job list data from metadata stored in the job management DB and transfers the print job list data to the multi-function peripheral 102. The print server 101 updates print setting information using metadata stored and managed in the job management DB and print setting information received from the multi-function peripheral 102 and transfers the updated print setting information to the multi-function peripheral 102. Furthermore, the print server 101 generates PDL (Printer Description Language) data from the print job saved in the predetermined storage location and metadata stored and managed in the job management DB, and transfers the generated PDL data to the multi-function peripheral 102.

The address management server 103 includes an address management database (hereinafter referred to as "address management DB"). Upon execution of a "pull print" operation, the address management server 103 stores and manages the address and the user identifier of the print server 101 that manages a print job in the address management DB. Furthermore, the address management server 103 transmits the address of the print server 101 corresponding to the user identifier received from the multi-function peripheral 102 to the multi-function peripheral 102 in response to a print job list request from the multi-function peripheral 102.

The login service PC 104 provides the login service of the multi-function peripheral 102. The login service PC 104 performs authentication processing (e.g., SSO: Single Sign-ON) based on the login user name and the password of the client PC 100, which are stored and managed in the directory service server 105. The login user name and the password indicate the login user name and the password for accessing Windows (registered trademark) available from Microsoft Corporation. An example of the login service PC 104 includes a personal computer incorporating Security Agent available from Canon Corporation.

The directory service server 105 centrally stores and manages information such as hardware resources for servers, clients, printers, and the like present on a network, and attributes, access rights, and the like of users of these hardware resources. Examples of user attributes include the login user name and the password of the client PC 100 (e.g., the login user name and the password for accessing Windows (registered trademark) available from Microsoft Corporation). An example of the directory service server 105 is a server incorporating an active directory function.

In the printing system of the present embodiment, the "business office A" having a configuration as described above and one or a plurality of the "business offices B" having the same configuration as that of the "business office A" may also be connected to each other via a WAN 107.

Figure 2:
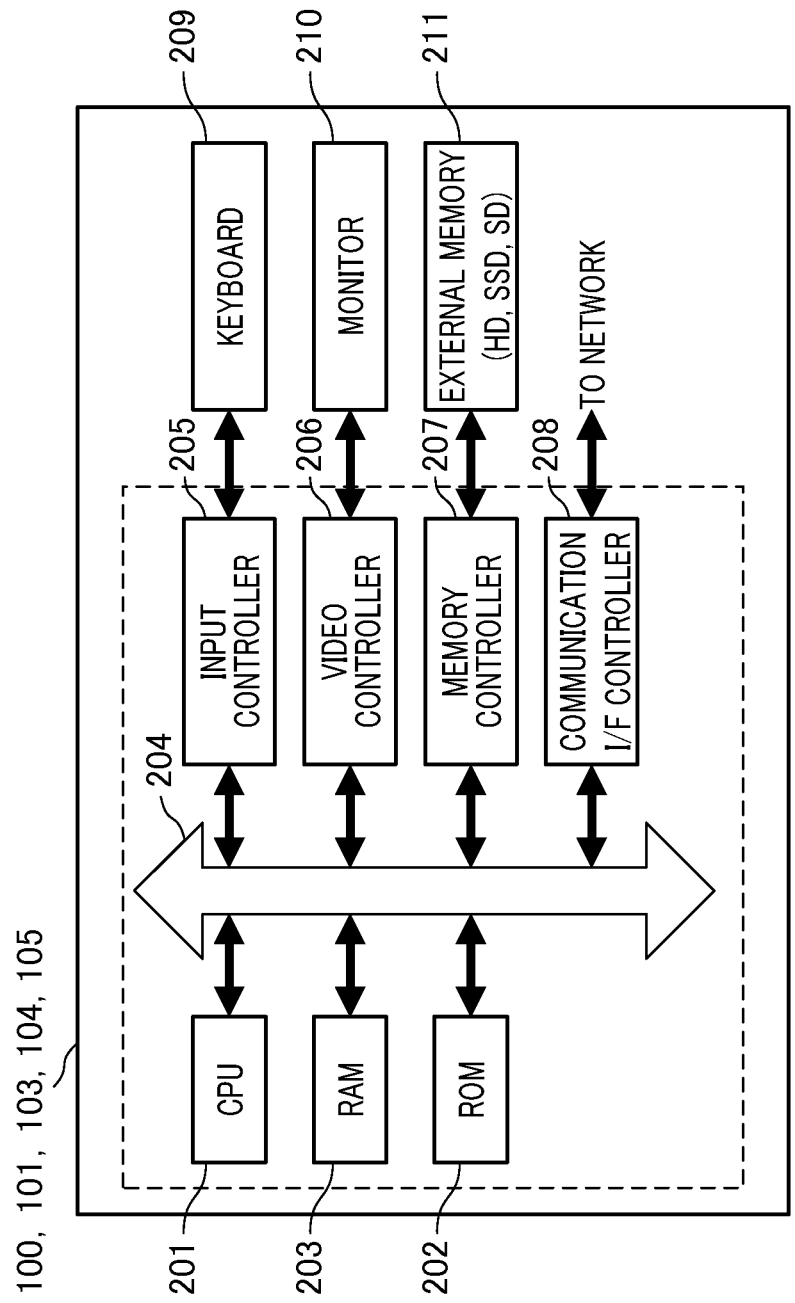
FIG. 2 is a block diagram illustrating an example of the hardware configuration of an information processing apparatus.

FIG. 2 is a block diagram illustrating the hardware configuration of an information processing apparatus which can be used by the client PC 100, the print server 101, the address management server 103, the login service PC 104, and the directory service server 105 shown in FIG. 1. In FIG. 2, a CPU 201 comprehensively controls accesses to various devices and controllers connected to a system bus 204. A ROM 202 or an external memory 211 stores BIOS (Basic Input/Output System) or an operating system program (hereinafter referred to as "OS") which is the control program of the CPU 201. Furthermore, the ROM 202 or the external memory 211 also stores various computer programs (to be described below) required for realizing the functions to be executed by each server or each PC. Reference number 203 indicates a RAM that functions as a main memory, work area, and the like for the CPU 210.

The CPU 201 loads programs and the like which are necessary for executing a process from the ROM 202 or the external memory 211 to the RAM 203 and executes the loaded program to thereby implement various operations. Also, the reference number 205 indicates an input controller that controls input from a keyboard 209, a pointing device such as a mouse (not shown), and the like. Reference number 206 indicates a video controller that controls display on a monitor 210. In general, the monitor 210 is a display device such as a liquid crystal display, a CRT, or the like. These are intended to be used by the administrator as required.

A memory controller 207 controls access to the external memory 211. The external memory indicates a hard disk (HD), an SSD (Solid State Drive), an SD memory card, or the like for storing a boot program, various applications, font data, user files, edit files, various data, and the like. Reference number 208 indicates a communication I/F controller that is connected to and communicates with an external device via a network (e.g., the LAN 106 shown in FIG. 1) to thereby execute communication control processing on the network. For example, the communication I/F controller 208 can provide communication using a TCP/IP.

Note that the CPU 201 enables display on the monitor 210 by executing, for example, outline font rasterization processing to a display information area in the RAM 203. Also, the CPU 201 can provide user instructions with a mouse cursor (not shown) or the like on the monitor 210. Various programs (to be described below) for realizing the present invention are stored in the external memory 211. The various programs are loaded into the RAM 202 as required and are executed by the CPU 201. Furthermore, the external memory 211 additionally stores definition files, various information tables, and the like to be used upon execution of the programs, and a detailed description for these components will be given below.

Figure 3:
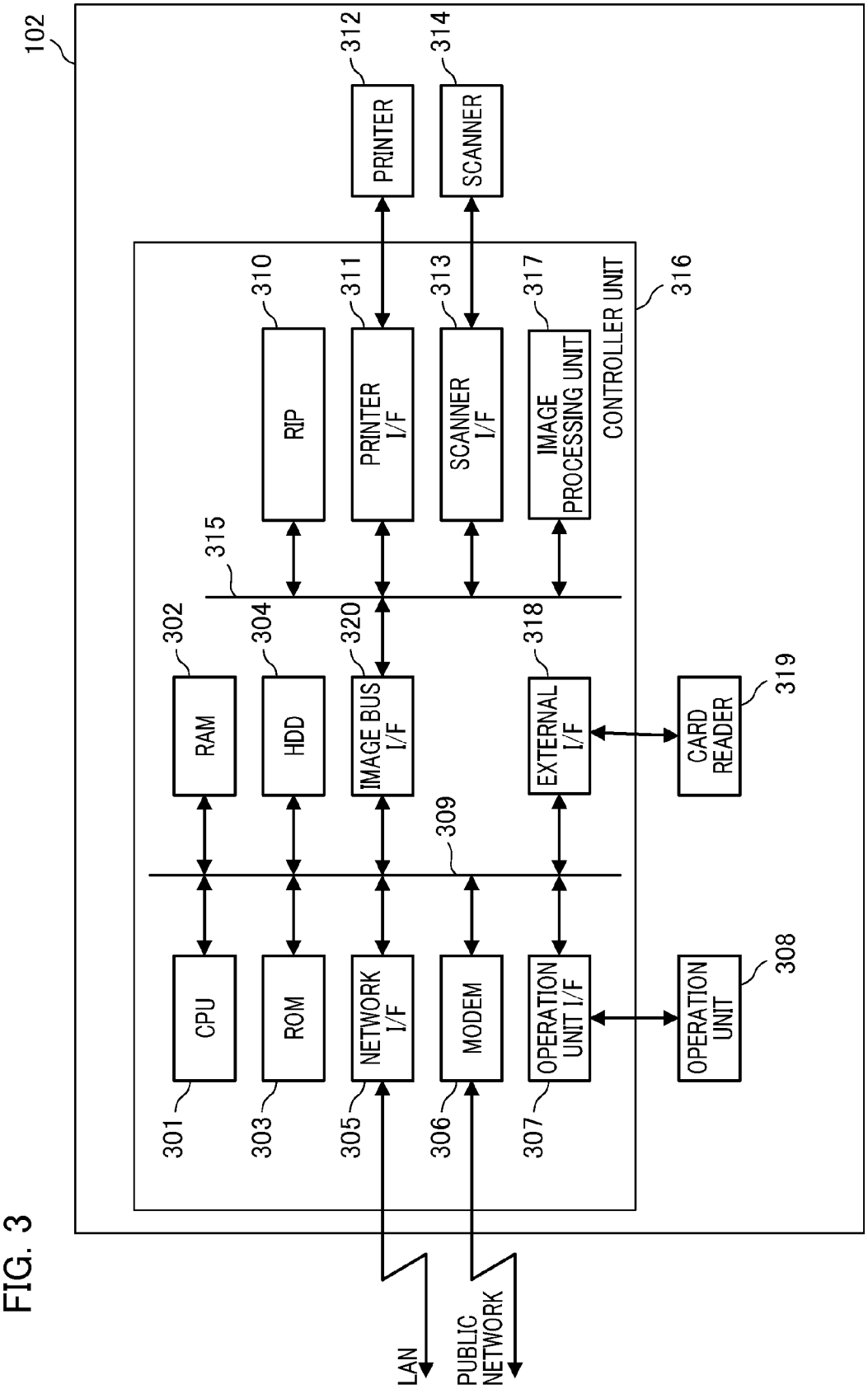
FIG. 3 is a block diagram illustrating an example of the hardware configuration of a multi-function peripheral.

FIG. 3 is a block diagram illustrating an example of the hardware configuration of the controller unit provided in the multi-function peripheral 102 shown in FIG. 1. In FIG. 3, the reference number 316 indicates a controller unit that is connected to a scanner 314 which functions as an image input device and a printer 312 which functions as an image output device. On the other hand, the controller unit 316 is connected to LAN (e.g., the LAN 106 shown in FIG. 1) or a public line (WAN) (e.g., PSTN or ISDN) to thereby input/output image data or device information.

In the controller unit 316, the reference number 301 indicates a CPU which is a processor for controlling the overall system. Reference number 302 indicates RAM which is a system work memory necessary for the CPU 301 to run. The RAM 302 is also a program memory for recording programs and an image memory for temporarily recording image data. Reference number 303 indicates ROM that stores a boot program and various control programs for the system. Reference number 304 indicates a hard disk drive (HDD) that stores various programs for controlling the system, image data, and the like.

Reference number 307 indicates an operation unit interface (operation unit I/F) that is an interface with an operation unit (UI) 308 and outputs image data to be displayed on the operation unit 308 to the operation unit 308. Also, the operation unit I/F 307 notifies the CPU 301 of information (e.g., user information) input by the system user via the operation unit 308. Note that the operation unit 308 includes a display unit having a touch panel. A user presses (touches with his/her finger or the like) a button displayed on the display unit to thereby be able to input various instructions. Reference number 305 indicates a network interface (Network I/F) that is connected to a network (LAN) to input/output data. Reference number 306 indicates a modem (MODEM) that is connected to a public line to perform data input/output such as FAX transmission/reception. Reference number 318 indicates an external interface (external I/F) that is an I/F unit for receiving an external input via a USB, an IEEE1394, a printer port, an RS-232C, or the like.

In the present embodiment, a card reader 319 is connected to the external I/F unit 318 to read an IC card necessary for authentication. The CPU 301 controls reading of information from the IC card by the card reader 319 via the external I/F 318 and can acquire information read from the IC card. The aforementioned devices are arranged on a system bus 309. Reference number 320 indicates an image bus interface (IMAGE BUS I/F) serving as a bus bridge that connects the system bus 309 with an image bus 315 which transfers image data at high speed and converts the data structure.

The image bus 315 is composed of a PCI bus or an IEEE1394. The following devices are arranged on the image bus 315. Reference number 310 indicates a raster image processor (RIP) that rasterizes vector data such as a PDL code into a bitmap image. Reference number 311 indicates a printer interface (printer I/F) that connects the printer 312 with the controller unit 316 so as to perform synchronous/asynchronous conversion of image data. Reference number 313 indicates a scanner interface (scanner I/F) that connects the scanner 314 with the controller unit 316 so as to perform synchronous/asynchronous conversion of image data. Reference number 317 indicates an image processing unit that performs correction, processing, and editing for input image data and performs printer correction, resolution conversion, and the like for printout image data. In addition, the image processing unit 317 performs rotation of image data, compression/decompression processing using JPEG on multi-valued image data, and compression/decompression processing using JBIG, MMR, MH or the like on binary image data.

The scanner unit 314 illuminates an image on an original sheet and scans the image with a CCD line sensor to thereby convert light reflected from the original sheet into an electrical signal as raster image data. A user sets original sheets in the tray of an original feeder and designates the start of reading from the operation unit 308. Then, the CPU 301 provides instructions to the scanner 314 and the feeder feeds the original sheets one by one to thereby perform the reading operation of original images. The printer 312 is a section in which raster image data is converted into an image on a sheet. Examples of printing methods using the printer 312 include an electrophotographic method using a photosensitive drum or photosensitive belt, or an inkjet method for discharging ink from a minute nozzle array to directly print an image on a sheet, and any method may be employed.

The print operation by the printer 312 is started by an instruction from the CPU 301. Note that the printer 312 includes a plurality of paper feed stages and the corresponding paper cassettes so as to allow selecting different paper sizes or different paper orientations. The operation unit 308 includes an LCD display unit having an LCD screen onto which a touch panel sheet is adhered. The operation unit 308 displays a system operation screen as well as notifies the CPU 301 of position information via the operation unit I/F 307 when the key being displayed is pressed.

The operation unit 308 includes various operation keys such as a start key, a stop key, an ID key, and a reset key. Here, the start key of the operation unit 308 is used at the time of the start of a reading operation of original images. An LED of two, green and red, colors is arranged at the center of the start key, and the color represents whether or not the start key is ready for use. The stop key of the operation unit 308 is used to stop a running operation. The ID key of the operation unit 308 is used to input the user ID of a user. The reset key is used to initialize settings from the operation unit. Under the control of the CPU 301, the card reader 319 reads information stored in an IC card (e.g., FeliCa (registered trademark) available from Sony Corporation) and notifies the CPU 301 of the read information via the external I/F 318.

With the configuration described above, the multi-function peripheral 102 can transmit image data scanned by the scanner 314 to the LAN 106 and use the printer 312 to print out print data received from the LAN 106. Also, the multi-function peripheral 102 can FAX-transmit image data scanned by the scanner 314 to the public line via the modem 306 and use the printer 312 to output image data FAX-received from the public line.

A description will be given of an overall pull print sequence in the printing system of the present embodiment with reference to FIG. 4. Firstly, a description will be given of the preconditions for executing pull print in the present embodiment. A virtual printer driver for realizing pull print in the present embodiment is installed as a shared printer in the print server 101. The virtual printer driver generates a print job in an intermediate format based on designated printing or output of a drawing instruction from an application. Furthermore, the virtual printer driver has a function (user interface) of making a print setting for controlling the functions provided by a printer driver or a printer, a function of storing the print setting in an external storage device for each installed logical printer, and the like.

The print setting is stored in a DEVMODE structure for Windows (registered trademark) available from Microsoft Corporation, USA. The DEVMODE structure is defined by Microsoft, USA, to store various settings including default operation conditions regarding a logical printer, such as functions usable by a printer, layout setting, finishing setting, paper feed/discharge setting, and print quality setting. These various setting values are stored in the external storage device for each installed logical printer. Each client PC 100 downloads a virtual printer driver from the print server 101 by point & print or the like and installs it to thereby add the logical printer of the virtual printer driver.

Hereinafter, a description will be given of the overall pull print sequence of the present embodiment. FIG. 4 is a schematic diagram illustrating the overall sequence of pull print (generally called "print anywhere") in the printing system of the present embodiment. As shown in FIG. 4, a user first logs into the client PC 100 and inputs a print instruction from a client application 400 executed by the client PC 100 to a logical printer corresponding to the virtual printer driver 401 (1-1). Note that the virtual printer driver is provided at the previous stage of a driver 408, and thus, is referred to as a "previous stage printer driver".

In accordance with the print instruction, the client application 400 of the client PC 100 transmits data to the virtual printer driver 401 via a graphic engine. The virtual printer driver 401 of the client PC 100 generates a device-independent print job in the EMFSPOOL format based on the data received from the client application via the graphic engine. Then, the client PC 100 transmits the generated print job in the EMFSPOOL format to a print processor 402 (1-2). The print processor 402 reads the print job in the EMFSPOOL format transmitted from the virtual printer driver 401 and generates metadata for the print job. Then, the print processor 402 transmits the metadata and the print job in the EMFSPOOL format to a job management service 403 (1-3).

In the print server 101, the job management service 403 saves the print job in the EMFSPOOL format in a predetermined storage location on the print server 101. Furthermore, the job management service 403 registers metadata in a job management DB 404 (1-4). The job management DB 404 is built into the external storage device of the print server 101. At this time, the print server 101 only saves the print job in the EMFSPOOL format in the predetermined storage location without transmitting the print job to the printing apparatus. Furthermore, the print server 101 transmits an identifier of the print job in the EMFSPOOL format and a user identifier to register them in an address management service 405 on the address management server 103 (1-5).

Upon receiving the print job identifier and the user identifier from the job management service 403, the address management service 405 registers not only both identifiers but also the address of the print server 101 in an address management DB 406 (1-6). The address management DB 406 is built into the external storage device of the address management server 103. Note that the present embodiment uses an IP address as an address for discriminating a device. In the present embodiment, a GUID (Global Unique Identifier) is used as the job identifier.

When the multi-function peripheral 102 detects an IC card readable by the card reader 319, the multi-function peripheral 102 reads personal authentication information in the IC card and transmits the read personal authentication information as an authentication request to an authentication server (not shown). Personal authentication information is information used for authentication and may be the serial number of the IC card. Upon receiving personal authentication information from the multi-function peripheral 102, the authentication server performs authentication processing for the personal authentication information based on an IC card authentication table stored in the external storage device of the authentication server, and sends back the authentication result to the multi-function peripheral 102. Assume that the authentication server transmits the user identifier of the client PC 100 as the authentication result if the authentication processing is successful. Note that the function of the authentication server may reside in the address management server 103.

A panel application 407 on the multi-function peripheral 102 receives the authentication result (login user identifier of the client PC 100) indicating that authentication is successful. In the present embodiment, a user name is used as the user identifier. Needless to say, the method for identifying a user may be the serial number of an IC card or the like. The panel application 407 requests a print job list from the print server 101. Prior to making the request, the panel application 407 executes preprocessing to acquire the IP address of the print server 101. That is, the panel application 407 transmits a user name to the address management service 405 on the address management server 103 (2-1). The address management service 405 acquires the IP address of the print server 101 corresponding to the received user name (2-2). Then, the address management service 405 sends back the address of the print server 101 to the panel application 407 (2-3). Upon receiving the IP address of the print server 101 from the address management service 405, the panel application 407 requests a print job list with respect to the job management service 403 on the print server 101 (2-4). The job management service 403 looks up the job management DB 404 (2-5), generates a print job list corresponding to the user name, and sends back the print job list to the panel application 407 (2-6). Upon receiving the print job list from the job management service 403, the panel application 407 displays the print job list on the UI of the operation unit 308.

When a user selects a print job and issues a print setting change instruction and a print instruction, the panel application 407 transmits print setting information about the selected print job to the job management service 403 (3-1). Upon receiving the print setting information from the panel application 407, the job management service 403 looks up the job management DB 404 (3-2) and changes the print setting information. Then, the job management service 403 sends back the changed print setting information to the panel application 407 (3-3). The panel application 407 compares the transmitted print setting information with the received print setting information to thereby determine whether the print setting has been changed correctly. If the print setting has not been changed correctly, the panel application 407 displays a message to this effect on the UI of the operation unit 308.

Then, the panel application 407 issues again a print request (output instruction) to the job management service 403 (4-1). Upon receiving the print instruction from the panel application 407, the job management service 403 looks up the job management DB 404 and acquires information necessary to print the print job (4-2). Then, the job management service 403 inquires a printer driver 408 as to confirm a function support status (4-3) and acquires a response from the printer driver 408 (4-4). The job management service 403 executes print processing based on the response, transmits the print job in the EMFSPOOL format to the printer driver 408 (4-5), and transmits the PDL job to the multi-function peripheral 102 to cause it to print the PDL job (4-6). Note that the printer driver 408 is provided at the subsequent stage of the virtual printer driver, and thus, is also referred to as a "subsequent stage driver".

Finally, when a user provides an instruction to delete a print job, the panel application 407 instructs the job management service 403 to delete the designated print job (5-1). Upon receiving a print job deletion request from the panel application 407, the job management service 403 instructs the address management service 405 to delete a registered print job identifier (5-2). Upon receiving a print job identifier registration release request from the job management service 403, the address management service 405 deletes a corresponding record from the address management DB 406 (5-3). Next, the job management service 403 deletes a corresponding record from the job management DB (5-4) and deletes a print job file in the EMFSPOOL format as well.

Figure 4:
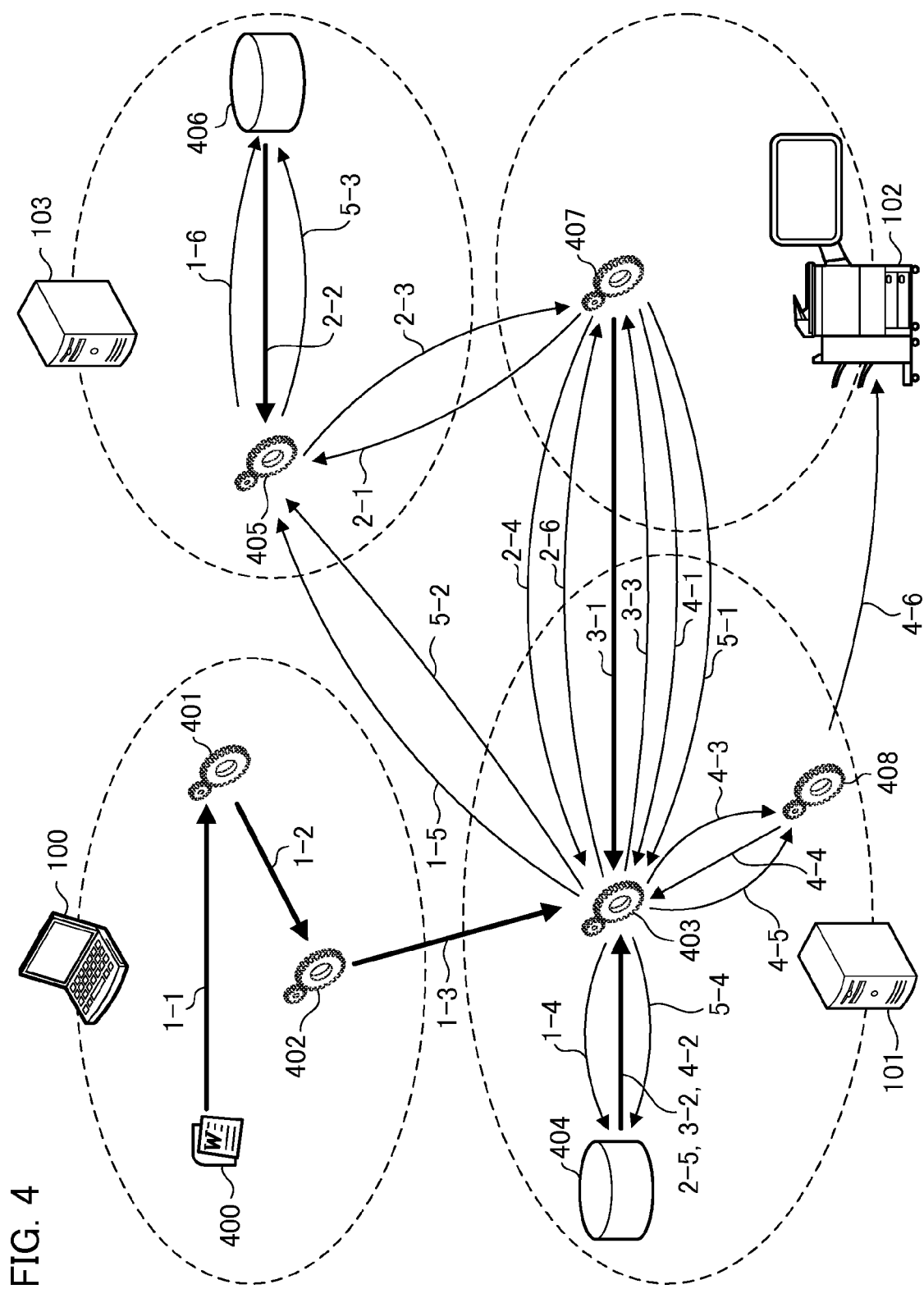
FIG. 4 is a schematic diagram illustrating the overall sequence of processing according to the present embodiment.

FIGS. 5A and 5B show the details of data in the printing system shown in FIG. 4 in a table form. Processing will be described below in detail with reference to flowcharts. At this time, the description will be complemented with reference to FIGS. 5A and 5B.

Figure 6:
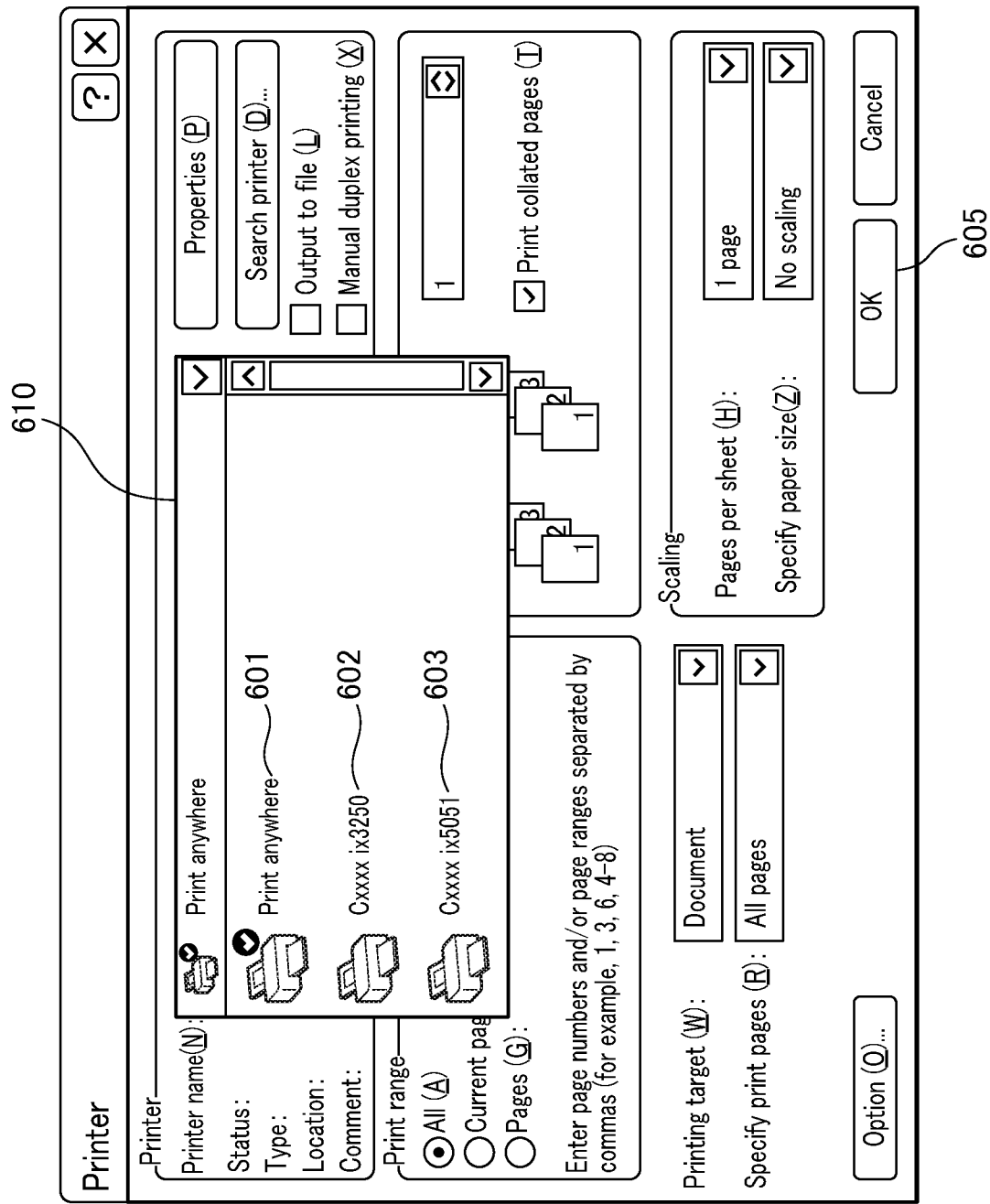
FIG. 6 is a schematic diagram illustrating an example of a print screen on a client PC.

A description will be given of a print instruction on the client application 400 running on the client PC 100 shown in FIG. 1. FIG. 6 is a schematic diagram illustrating an example of a print screen of the client application 400 running on the client PC 100 shown in FIG. 1. The display unit displays the print screen under the control of the CPU of the client PC 100. Reference number 610 indicates a logical printer selection unit that allows a user to select a logical printer for printout from logical printers set in the client PC 100. In the printer selection field 610, "print anywhere" 601 is a logical printer corresponding to a virtual printer driver set for pull print in the embodiment. Furthermore, "Cxxxx ix3250" 602 and "Cxxxx ix5051" 603 are logical printers corresponding to normal printer drivers.

When the user selects one logical printer in the printer selection field 610 and presses an OK button 605, the client application 400 transmits data for printout to a printer driver corresponding to the selected logical printer via the graphic engine. Hereinafter, a description will be given of the operation of a printer driver when a user selects the "print anywhere" 601 in the printer selection field 610 and issues a print instruction.

Figure 7:
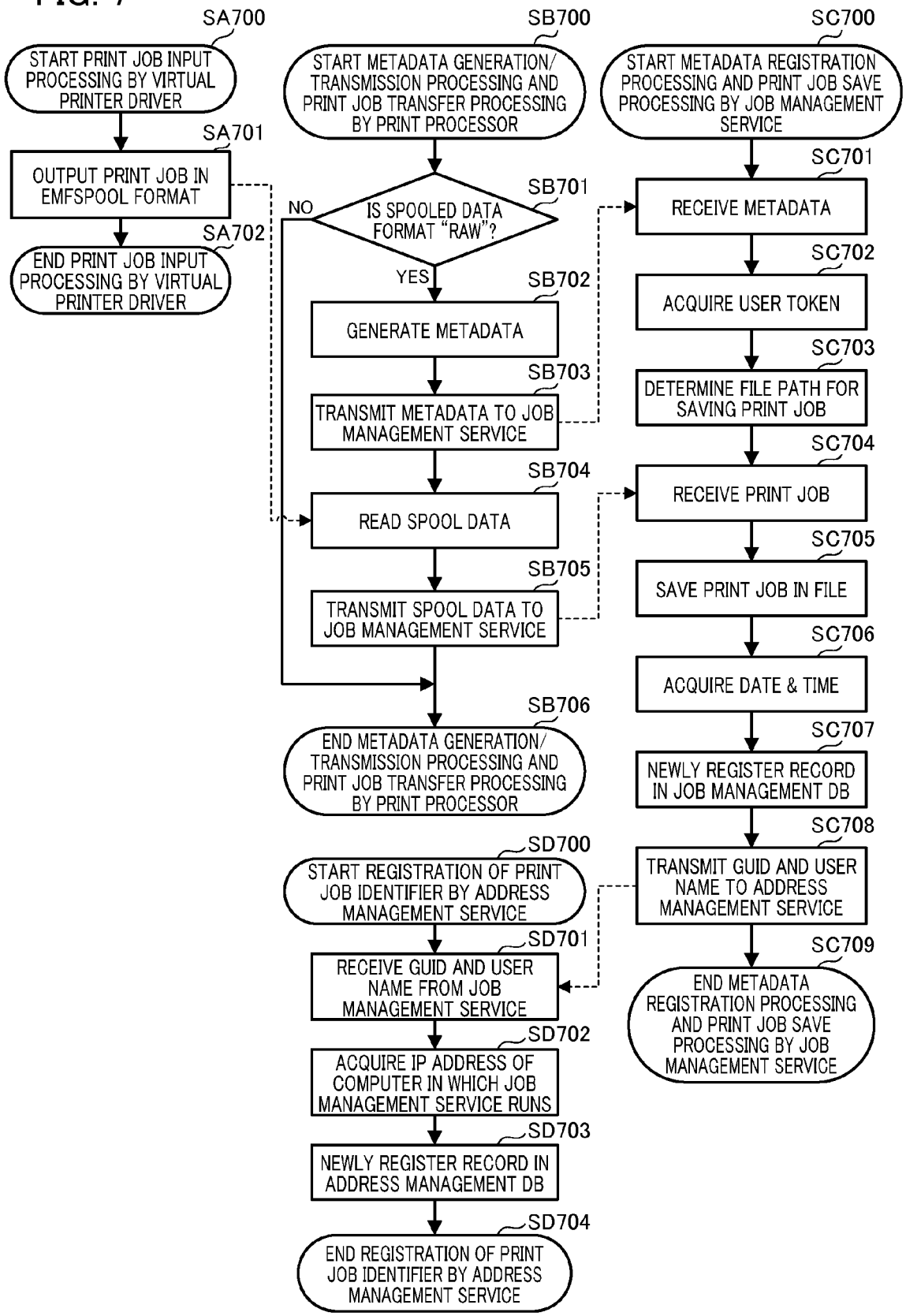
FIG. 7 is a flowchart illustrating an example of the first control processing procedure of the present invention.

FIG. 7 is a flowchart illustrating an example of the first control processing procedure in the printing system of the present invention. This procedure corresponds to the processing procedure from 1-1 to 1-6 shown in FIG. 4. Steps SA700 to SA702 correspond to print job input processing by the virtual printer driver 401 shown in FIG. 4. These flowchart processes are implemented by loading a program stored in the external memory into the RAM and executing the program by the CPU of the client PC 100 shown in FIG. 1. Steps SB700 to SB706 correspond to metadata generation/transmission processing and print job transfer processing by the print processor 402 shown in FIG. 4. These flowchart processes are implemented by loading a program stored in the external memory into the RAM and executing the program by the CPU of the print server 101 shown in FIG. 1. Steps SC700 to SC709 correspond to metadata registration processing and print job save processing by the job management service 403 shown in FIG. 4. These flowchart processes are implemented by loading a program stored in the external memory into the RAM and executing the program by the CPU of the print server 101 shown in FIG. 1. Steps SD700 to SD704 correspond to print job identifier registration processing by the address management service 405 shown in FIG. 4. These flowchart processes are implemented by loading a program stored in the external memory into the RAM and executing the program by the CPU of the address management server 103 shown in FIG. 1.

Firstly, a description will be given of print job input processing by the virtual printer driver 401. In step SA700, processing by the virtual printer driver 401 is started. In step SA701, the virtual printer driver 401 outputs data input from the client application 400 in FIG. 4 as a print job in the EMFSPOOL format. This corresponds to 1-1 and 1-2 in FIG. 4. In the case of Windows (registered trademark) available from Microsoft Corporation, USA, input to the printer driver is executed by a function call by the OS (Operating System) which is called as DDI (Device Driver Interface).

The virtual printer driver 401 interprets a parameter passed at the same time as the DDI call, generates a print job in the EMFSPOOL format, and outputs the generated job to a spooler managed by the OS. In general, the role of the printer driver is to generate and output a print job dependent on an output device. In the present embodiment, it is important to generate and output a print job in an intermediate format independent of the multi-function peripheral 102. Hence, even if the configuration of the multi-function peripheral 102 is changed, the configuration of the virtual printer driver 401 does not change in the printing system of the present invention. That is, a function unique to the multi-function peripheral can be easily used in the pull print system. The process is ended in step SA702.

Next, a description will be given of metadata generation/transmission processing and print job transfer processing by the print processor 402. In the case of Windows (registered trademark) available from Microsoft Corporation, USA, internal processing by a PrintDocumentOnPrintProcessor function, which is called when the OS requests a print processor to process a print job, will be described. In step SB700, the print processor 402 starts processing on the print server 101. In step SB701, the print processor 402 determines whether or not the type of job output to the spooler of the OS is the RAW format. The RAW format means a print job output from the printer driver. In other words, since the virtual printer driver 401 has output the print job in step SA701, it is determined that the job type is the RAW format, and the process advances to step SB702. If it is determined that the job type is not the RAW format, the process advances to step SB706 and ends.

In step SB702, the print processor 402 generates metadata. Metadata includes the GUID (Global Unique Identifier), job name, user name, DEVMODE, and logical printer name of the virtual printer driver on the "transmission data" column on the "1-4" row shown in FIG. 5A. More specifically, metadata is expressed in XML format as shown in FIG. 13A. The Guid attribute of the JobInfo element describes a print job identifier that is unique in the printing system of the present invention. The JobName attribute of the JobInfo element describes the name of a job designated in the process 1-1 shown in FIG. 4. The UserName attribute of the JobInfo element describes the name of a user who executed printing in the process 1-1 shown in FIG. 4. The PrintQueueName attribute of the JobInfo element describes the name of a logical printer used in the process 1-1 shown in FIG. 4. The DEVMODESnapshot attribute of the DocumentSettings element describes the print setting (DEVMODE) of the first page designated in the process 1-1 shown in FIG. 4. Note that the DEVMODE is in a binary format, and is converted into a text by a Base64 method to describe data by XML.

In step SB703, the print processor 402 transmits the metadata generated in step SB702 to the job management service 403. In the case of Windows (registered trademark) available from Microsoft Corporation, USA, a named pipe can be used as a transmission protocol efficiently. The use of the named pipe is also convenient even for acquisition of a user token to be described below. In step SB704, the print processor 402 reads spool data from the spooler of the OS. In step SB705, the print processor 402 transmits the read spool data to the job management service 403. The process is ended in step SB706.

Next, a description will be given of metadata registration processing and print job save processing by the job management service 403. In step SC700, the job management service 403 starts processing on the print server 101. In step SC701, the job management service 403 functions as a named pipe server, and thus, receives the metadata transmitted from the print processor 402 in step SB703 in the XML format as shown in FIG. 13A. When establishing a connection with the print processor 402, the job management service 403 acquires the user token of a named pipe client (that is, the print processor 402) (step SC702). The usage of the user token will be described below.

In step SC703, the job management service 403 determines a file path for saving the print job in the EMFSPOOL format. In step SC704, the job management service 403 receives the print job in the EMFSPOOL format transmitted from the print processor 402 in step SB705. In step SC705, the job management service 403 saves the received print job in the EMFSPOOL format with the file name determined in step SC703. In step SC706, the job management service 403 generates the current date & time as the print job input time. In step SC707, the job management service 403 registers the metadata received in step SC701, the user token acquired in step SC702, the file name determined in step SC703, and the date & time generated in step SC706 as new records in the job management DB 404. In step SC708, the job management service 403 transmits a print job identifier registration command to the address management service 405. At this time, the job management service 403 also transmits the GUID and user name contained in the metadata received in step SC701. The process is ended in step SC709.

Next, a description will be given of print job identifier registration processing by the address management service 405. In step SD700, the address management service 405 starts processing on the address management server 103. In step SD701, the address management service 405 receives the GUID and user name transmitted from the job management service 403 in step SC708. When establishing a connection with the job management service 403, the address management service 405 acquires the IP address of the print server 101 (step SD702). In step SD703, the address management service 405 registers the GUID and user name received in step SD701 and the IP address acquired in step SD702 as new records in the address management DB 406 shown in FIG. 4. The process is ended in step SD704.

Figure 8:
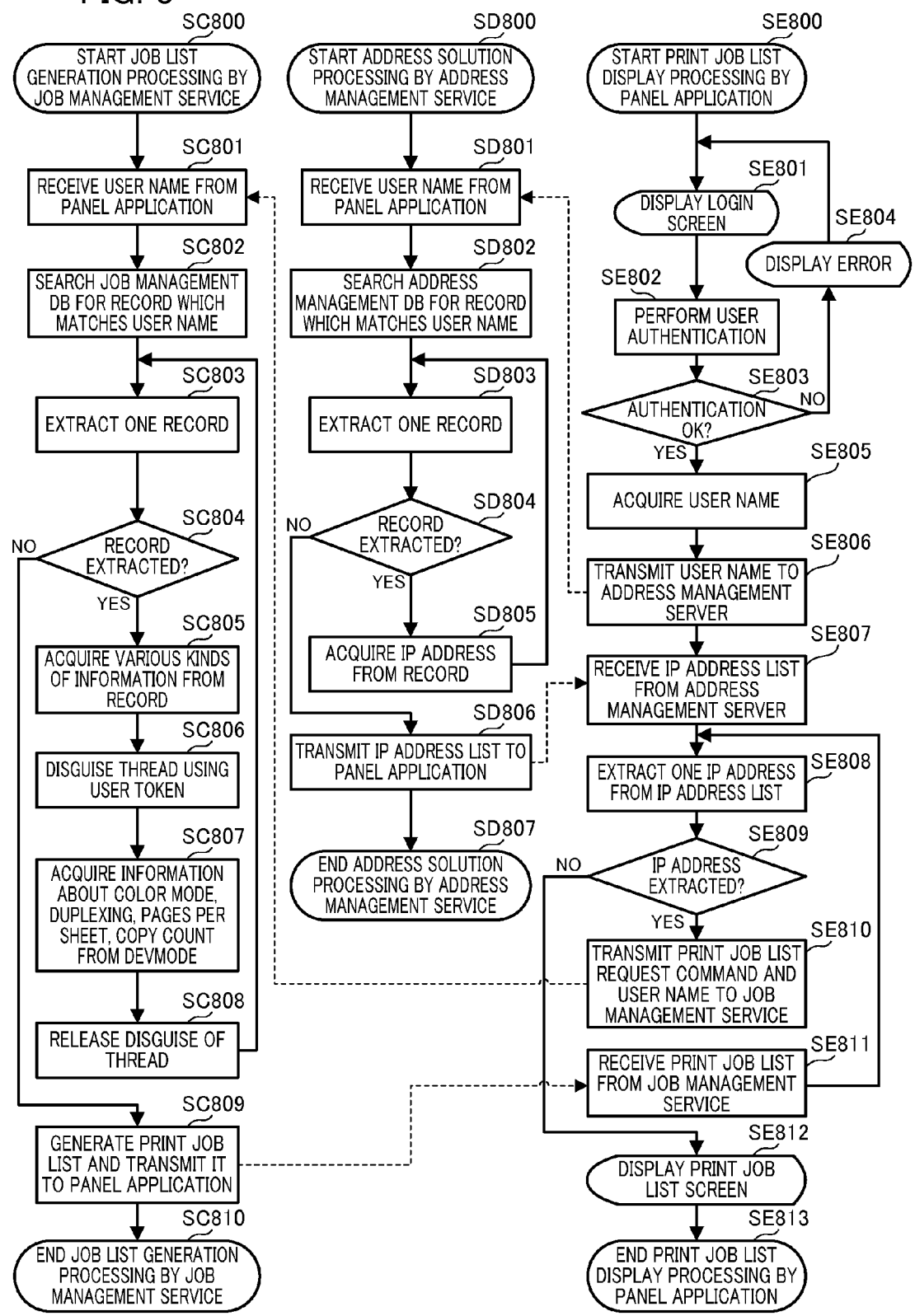
FIG. 8 is a flowchart illustrating an example of the second control processing procedure of the present invention.

FIG. 8 is a flowchart illustrating an example of the second control processing procedure in the printing system of the present invention. This procedure corresponds to the processing procedure from 2-1 to 2-6 shown in FIG. 4. Steps SE800 to SE813 correspond to print job list display processing by the panel application 407 shown in FIG. 4. These flowchart processes are implemented by loading a program stored in the external memory into the RAM and executing the program by the CPU of the multi-function peripheral 102 shown in FIG. 1. Steps SD800 to SD807 correspond to address solution processing by the address management service 405 shown in FIG. 4. These flowchart processes are implemented by loading a program stored in the external memory into the RAM and executing the program by the CPU of the address management server 103 shown in FIG. 1. Steps SC800 to SC810 correspond to print job list generation processing by the job management service 403 shown in FIG. 4. These flowchart processes are implemented by loading a program stored in the external memory into the RAM and executing the program by the CPU of the print server 101 shown in FIG. 1.

Figure 14A:
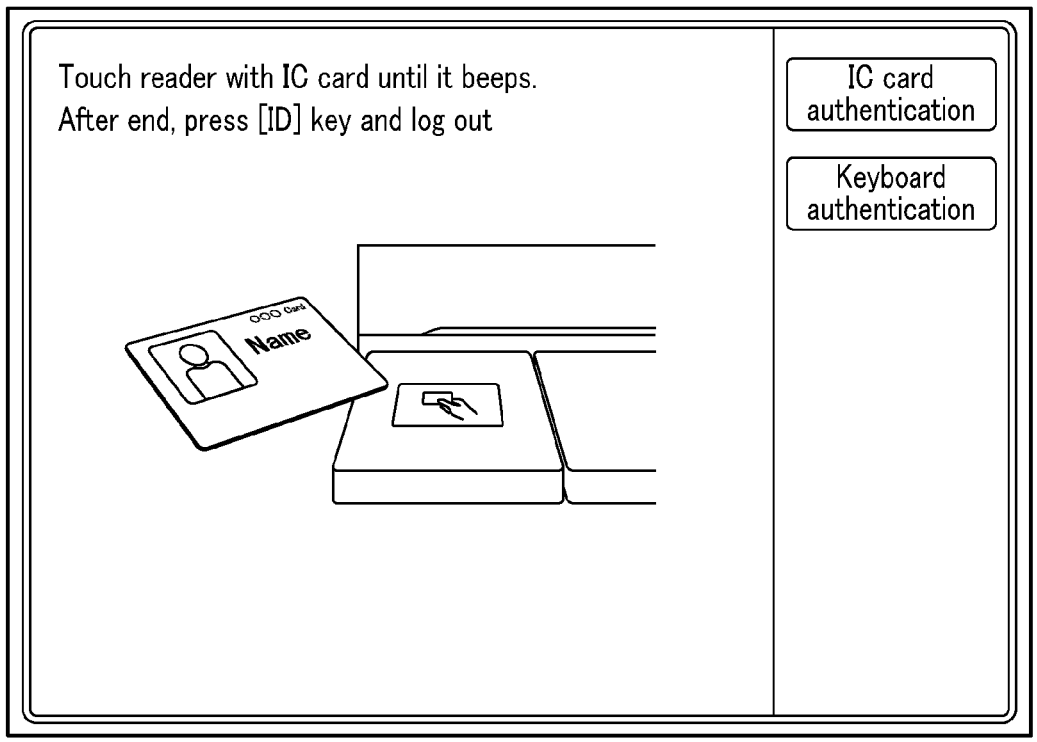
FIG. 14A is a schematic diagram illustrating a screen to be displayed on a display unit of an operation unit provided in a multi-function peripheral.

Firstly, a description will be given of print job list display processing by the panel application 407. In step SE800, processing by the panel application 407 is started. In step SE801, the panel application 407 displays a login display screen (FIG. 14A) on the operation unit 308. In step SE802, the panel application 407 performs user authentication based on an IC card or the like. In the present embodiment, user authentication is not an important process, and thus, a detailed description of an authentication card detection method, an IC card identification ID acquisition method, and authentication processing by an authentication server will be omitted.

Figure 14B:
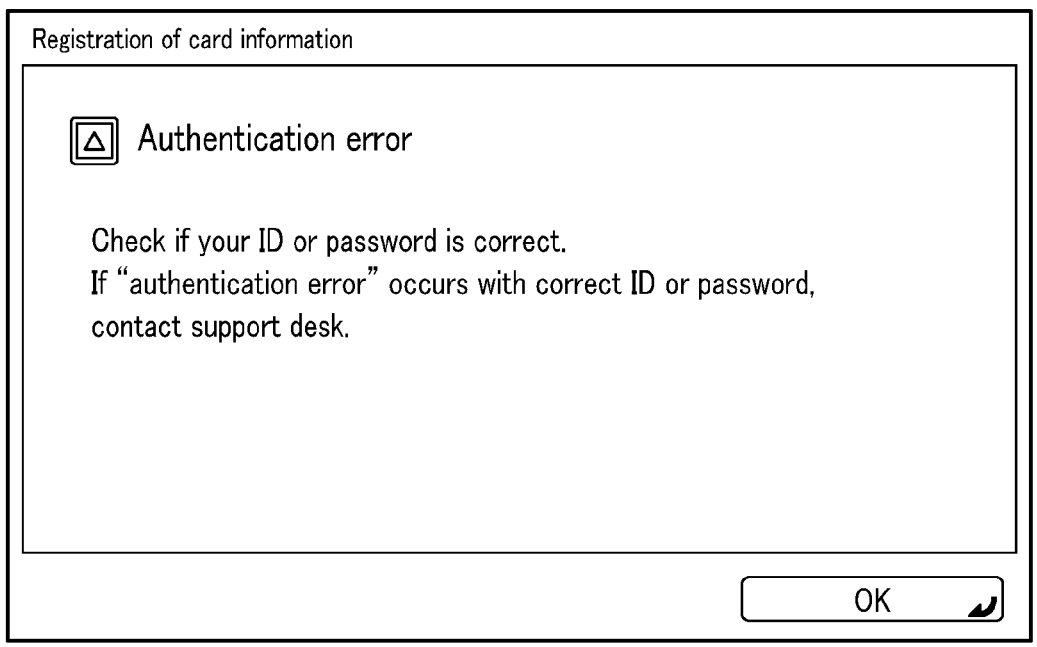
FIG. 14B is a schematic diagram illustrating a screen to be displayed on a display unit of an operation unit provided in a multi-function peripheral.

In step SE803, the panel application 407 determines the authentication result. If the authentication result indicates an authentication error in step SE803, the panel application 407 displays an error display screen (FIG. 14B) on the display unit of the operation unit 308 in step SE804. If the panel application 407 receives pressing of the OK button on the error display screen, the process returns to step SE801 and the panel application 407 displays the login display screen again. On the other hand, if the panel application 407 determines in step SE803 that authentication is successful, the process advances to step SE805.

In step SE805, the panel application 407 acquires the name of a user who has been authenticated successfully. In step SE806, the panel application 407 transmits the user name to the address management service 405. In step SE807, the panel application 407 receives the IP address list of the print server 101 from the address management service 405. That is, the panel application 407 requests the address management service 405 to narrow down target print jobs based on the user name and send back IP addresses of the job management service at which the print jobs are held.

Subsequent steps SE808 to SE811 are the loop processing of listing IP addresses from the IP address list. In step SE808, the panel application 407 extracts an IP address from the IP address list. In step SE809, the panel application 407 determines whether or not an IP address has been extracted. If an IP address has been extracted, the process advances to step SE810 and the panel application 407 transmits a print job list request command to the job management service 403. At this time, the panel application 407 also transmits the user name to the job management service 403.

In step SE811, the panel application 407 receives a print job list from the job management service 403. The print job list includes the GUID, job name, copy count, duplexing, color mode, pages per sheet, and date & time on the "transmission data" column on the "2-6" row shown in FIG. 5A. More specifically, the print job list is expressed in the XML format as shown in FIG. 13B. The JobList element holds JobInfo child elements by the number of jobs. The Guid attribute of the JobInfo element is the same as GUID described with reference to FIG. 13A. The JobName attribute of the JobInfo element is also the same as JobName described with reference to FIG. 13A.

On the other hand, various attributes held by the DocumentSettings element greatly differ from those shown in FIG. 8. The CopyCount attribute designates the number of copies. The Duplexing attribute designates which one of either one-sided printing or two-sided printing is used. More specifically, the description "OneSided" designates one-sided printing. The description "TwoSidedLongEdge" designates two-sided (long-edge binding). The description "TwoSidedShortEdge" designates two-sided (short-edge binding). The OutputColor attribute designates an output method regarding color. The description "Color" designates color. The description "Monochrome" designates monochrome. The PagesPerSheet attribute designates the number of pages which can be selected for printing on one side of a sheet. The DateTime attribute designates the job input time.

After the panel application 407 ends extraction of an IP address from the IP address list in steps SE808 to SE811, the process advances to step SE812. In step SE812, the panel application 407 displays a print job list display screen (FIG. 14C) on the operation unit 308. The process is ended in step SE813.

Next, a description will be given of address solution processing by the address management service 405. In step SD800, processing by the address management service 405 is started. In step SD801, the address management service 405 receives the user name transmitted from the panel application 407 in step SE806. In step SD802, the address management service 405 searches the address management DB 406 shown in FIG. 4 for a record which matches the user name received in step SD801. In step SD803, the address management service 405 extracts one record from the searched records.

In step SD804, the address management service 405 determines whether or not the record has been extracted. If the record has been extracted, the process advances to step SD805 and the address management service 405 extracts the IP address of the print server 101, on which the job management service 403 runs, from the record. After the completion of extracting IP addresses from all searched records in steps SD803 to SD805, the process advances to step SD806 and the address management service 405 sends back the IP address list to the panel application 407. The process is ended in step SD807.

Next, a description will be given of print job list generation processing by the job management service 403. In step SC800, processing by the job management service 403 is started. In step SC801, the job management service 403 receives the print job list request transmitted from the panel application 407 in step SE810. At this time, the job management service 403 also receives the user name. In step SC802, the job management service 403 searches the job management DB 404 shown in FIG. 4 for a record which matches the user name received in step SC801. In step SC803, the job management service 403 extracts one record from the searched records.

In step SC804, the job management service 403 determines whether or not the record has been extracted. If the record has been extracted, the process advances to step SC805 and the job management service 403 extracts a GUID, a job name, a DEVMODE, the logical printer name of a virtual printer driver, a user token, and date & time from the record. In step SC806, the job management service 403 disguises its thread using the user token extracted in step SC804. While the thread is disguised, the thread is executed in the security context of a user who executes printing using the client application 400 shown in FIG. 4.

In step SC807, the job management service 403 extracts pieces of information such as the color mode, duplexing, pages per sheet, and copy count from the DEVMODE extracted in step SC805. The DEVMODE is in a printer driver-specific data format managed by the printer driver. In order to extract pieces of information from the DEVMODE, an inquiry needs to be made to the printer driver that has generated the DEVMODE. Since the logical printer name of the virtual printer driver has been acquired in step SC807, the job management service 403 extracts pieces of information from the DEVMODE using the logical printer. In general, pieces of information are often extracted from the DEVMODE via an original expansion interface which is arranged in the printer driver to operate the DEVMODE. In recent years, there has also been a method using an XML print setting storage format called a "print ticket", which is defined by Microsoft Corporation, USA. That is, if the printer driver supports the print ticket, it is also possible to convert the DEVMODE into a print ticket and extract pieces of information from the print ticket.

In step SC808, the job management service 403 releases the disguise of the thread. After the completion of extracting pieces of print setting information from all searched records in steps SC803 to SC808, the process advances to step SC809 and the job management service 403 generates a print job list (FIG. 13B). Then, the job management service 403 sends back the print job list to the panel application 407. The process is ended in step SC810.

Figure 9:
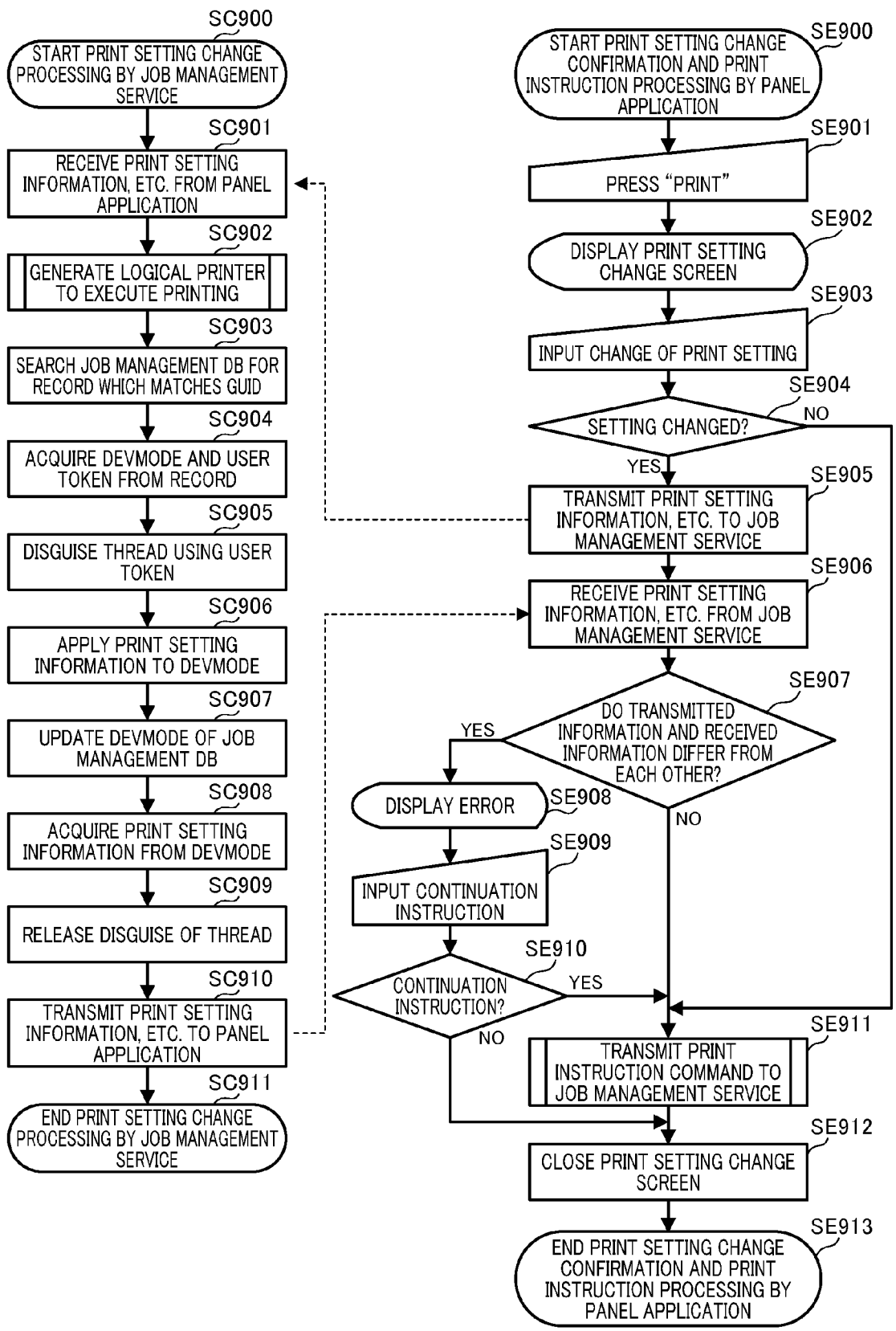
FIG. 9 is a flowchart illustrating an example of the third control processing procedure of the present invention.

FIG. 9 is a flowchart illustrating an example of the third control processing procedure in the printing system of the present invention. This procedure corresponds to the processing procedure from 3-1 to 3-3 shown in FIG. 4. Steps SE900 to SE913 correspond to print setting change confirmation and print instruction processing by the panel application 407 shown in FIG. 4. These flowchart processes are implemented by loading a program stored in the external memory into the RAM and executing the program by the CPU of the multifunction peripheral 102 shown in FIG. 1. Steps SC900 to SC911 correspond to print setting change processing by the job management service 403 shown in FIG. 4. These flowchart processes are implemented by loading a program stored in the external memory into the RAM and executing the program by the CPU of the job management server 101 shown in FIG. 1.

Firstly, a description will be given of print setting change confirmation and print instruction processing by the panel application 407. In step SE900, processing by the panel application 407 is started. In step SE812 shown in FIG. 8, the panel application 407 displays the print job list display screen (FIG. 14C) on the display unit of the operation unit 308. In step SE901, the panel application 407 receives selection of a print job and pressing of a print button 1422. Then, in step SE902, the panel application 407 displays a print setting change screen (FIG. 14D) on the display unit of the operation unit 308.

Figure 14D:
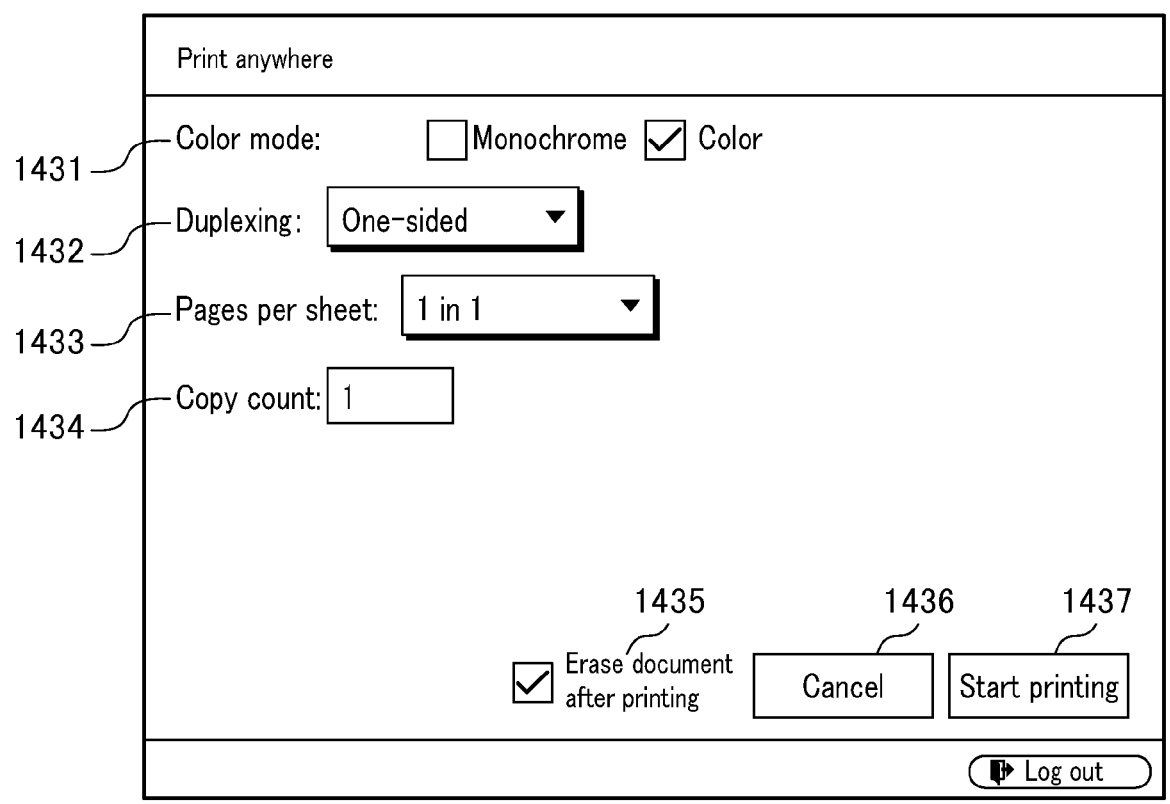
FIG. 14D is a schematic diagram illustrating a screen to be displayed on a display unit of an operation unit provided in a multi-function peripheral.

A setting 1431 in FIG. 14D indicates designation of the color mode, and allows the user to check either monochrome or color. A setting 1432 in FIG. 14D indicates designation of two-sided/one-sided, and allows the user to select one of one-sided, two-sided (long-edge binding), and two-sided (short-edge binding). A setting 1433 in FIG. 14D indicates designation of pages per sheet, and allows the user to select one of 1 in 1, 2 in 1, 4 in 1, 6 in 1, 8 in 1, 9 in 1, and 16 in 1. A setting 1434 in FIG. 14D indicates designation of the number of copies, and allows the user to designate a value of 1 to 9,999. FIG. 14D shows an example of a print setting change upon receiving selection of a print job with a document name "statement of accounts" in FIG. 14C and pressing of the print button 1422.

In step SE903, the panel application 407 receives a print setting change. Assume that the user has changed two-sided/one-sided designation at the setting 1432 in FIG. 14D from one-sided to two-sided (long-edge binding). In step SE904, the panel application 407 determines whether or not the print setting information has been changed. If no print setting information has been changed, the process skips subsequent print setting change confirmation processing and advances to step SE911. If the print setting information has been changed, the process advances to step SE905.

In step SE905, the panel application 407 transmits the print setting information to the job management service 403. The print setting information includes the GUID, copy count, duplexing, color mode, pages per sheet, and model name of the multi-function peripheral on the "transmission data" column on the "3-1" row shown in FIG. 5B. More specifically, the print setting information is expressed in the XML format as shown in FIG. 13C. The Guid attribute of the JobInfo element is the same as Guid described with reference to FIG. 13A. The DeviceModelName attribute of the JobInfo element describes the model name of the multi-function peripheral 102 shown in FIG. 1. Various attributes held by the DocumentSettings element are the same as those described with reference to FIG. 13B. However, one-sided has been changed to two-sided (long-edge binding) in step SE903, and thus, the Duplexing attribute becomes "TwoSidedLongEdge".

In step SE906, the panel application 407 receives print setting information which reflects the print setting change instruction from the job management service 403. The print setting information includes the GUID, copy count, duplexing, color mode, and pages per sheet on the "transmission data" column on the "3-3" row in FIG. 5B. More specifically, the print setting information is expressed in the XML format as shown in FIG. 13D. The contents are almost the same as those in FIG. 13C, and thus, a description thereof will be omitted. In step SE907, the panel application 407 compares the print setting information transmitted in step SE905 with the print setting information received in step SE906. As described above, the Duplexing attribute in the print setting information transmitted in step SE905 designates "TwoSidedLongEdge". However, assume that the Duplexing attribute in the print setting information received in step SE906 is "OneSided". Such a mismatch between the transmitted print setting information and received print setting information may occur in principle.

Setting information which is not changed in step SE903 is, for example, the paper size. Assume that the paper size is "postcard" in the process 1-1 shown in FIG. 4. As a print setting information prohibition condition, assume that two-sided/one-sided designation allows selection of only one-sided for paper "postcard". Furthermore, the preferential order to apply the prohibition condition is higher for paper size designation than for two-sided/one-sided designation. Thus, the Duplexing attribute has to be always "OneSided". If the same advanced prohibition processing as that of the printer driver is implemented in the panel application 407, a change of two-sided designation can be prohibited upon input of a setting change in FIG. 14D. However, this greatly complicates implementation of the panel application. It is therefore easy and versatile to inquire of the printer driver whether or not a change is possible every time print setting information is changed, without performing print setting information prohibition processing by the panel application 407, as in the present embodiment.

Figure 14E:
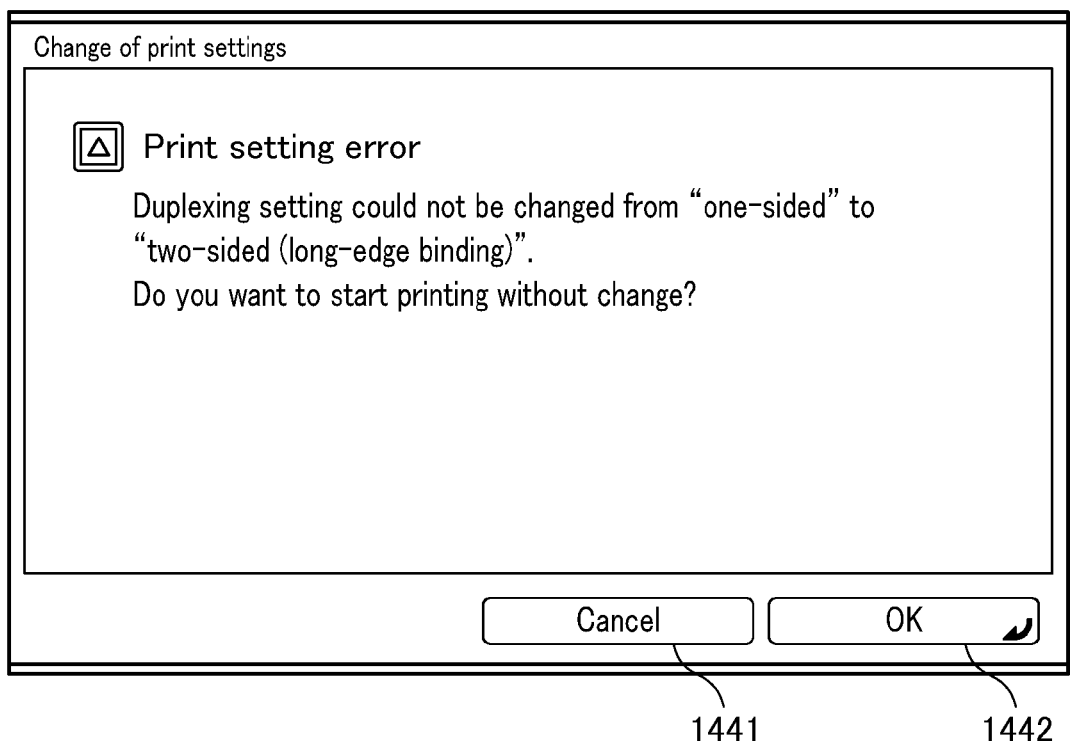
FIG. 14E is a schematic diagram illustrating a screen to be displayed on a display unit of an operation unit provided in a multi-function peripheral.

If the print setting information transmitted in step SE905 and the print setting information received in step SE906 are identical as a result of comparison by the panel application 407, the process advances to step SE911. If they are different, the process advances to step SE908 and the panel application 407 controls to display an error display screen (FIG. 14E) on the display unit of the operation unit 308. Since the Duplexing attribute of the print setting received in step SE906 is "OneSided", the error display in FIG. 14E indicates that a change from "one-sided" to "two-sided (long-edge binding)" has failed.

In step SE909, the panel application 407 receives input of a print continuation instruction. If the panel application 407 receives pressing of an OK button 1442 in step SE910, the process advances to step SE911. Print instruction processing in step SE911 will be described below. Then, the process advances to step SE912. On the other hand, if the panel application 407 receives pressing of a cancel button 1441 from the user via the error display screen in FIG. 14E, the process advances to step SE912, and the panel application 407 closes the error display screen in FIG. 14E and the print setting change screen in FIG. 14D. The process is ended in step SE913.

Next, a description will be given of print setting change processing by the job management service 403. In step SC900, processing by the job management service 403 is started. In step SC901, the job management service 403 receives print setting information transmitted from the panel application 407 in step SE905 in the XML format as shown in FIG. 13C. In step SC902, the job management service 403 generates a logical printer for changing a print setting. Details of this processing will be described below with reference to FIG. 10. In step SC903, the job management service 403 searches the job management DB 404 in FIG. 4 for a record which matches the GUID received in step SC901. In step SC904, the job management service 403 acquires a DEVMODE and user token from the searched record.

In step SC905, the job management service 403 disguises its thread using the user token acquired in step SC904. While the thread is disguised, the thread is executed in the security context of a user who executed printing using the client application 400 shown in FIG. 4. In step SC906, the job management service 403 applies pieces of print setting information received in step SC901 to the DEVMODE acquired in step SC904. The DEVMODE is in a printer driver-specific data format managed by the printer driver. In order to apply pieces of information to the DEVMODE, a printer driver which has generated the DEVMODE needs to be requested to update the DEVMODE. Since the logical printer has been generated in step SC902, pieces of information are applied to the DEVMODE using the logical printer. In general, pieces of information are often applied to the DEVMODE via an original expansion interface which is arranged in the printer driver to operate the DEVMODE. Recently, there is also a method using an XML print setting storage format called a "print ticket", which is defined by Microsoft Corporation, USA. If the printer driver supports the print ticket, it is also possible to convert the DEVMODE into a print ticket, apply pieces of information to the print ticket, and convert the print ticket into a DEVMODE.

In step SC907, the job management service 403 updates the DEVMODE saved in the job management DB 404 using the DEVMODE changed in step SC906. In step SC908, the job management service 403 extracts pieces of information such as the color mode, duplexing, pages per sheet, and copy count from the DEVMODE updated in step SC906. Extraction of pieces of information is the same as that in step SC807 shown in FIG. 8. In step SC909, the job management service 403 releases the disguise of the thread. In step SC910, the job management service 403 sends back the print setting information, which has been changed into the XML format as shown in FIG. 13D, to the panel application 407. The process is ended in step SC911.

Figure 10:
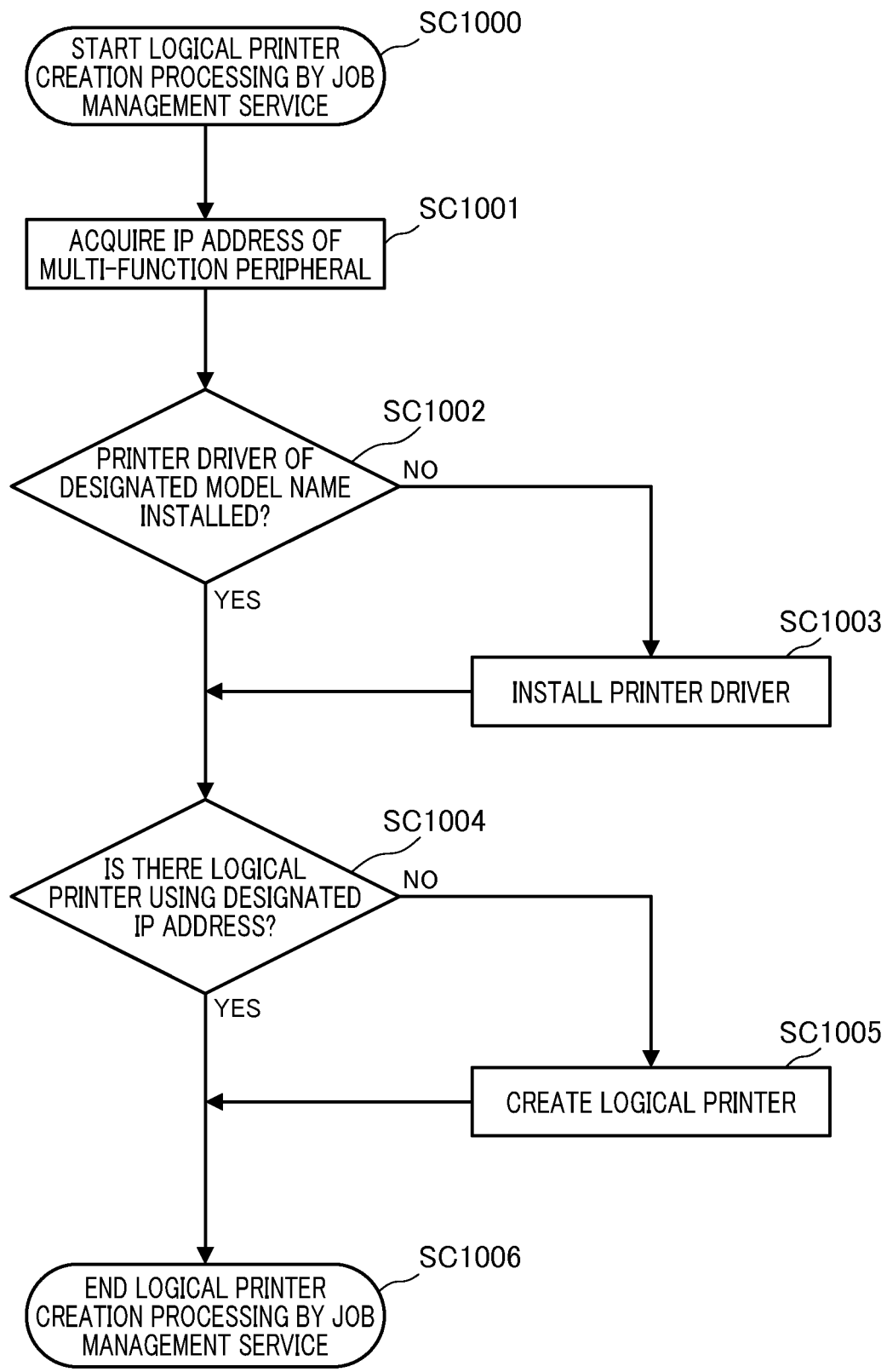
FIG. 10 is a flowchart illustrating the logical printer creating procedure of the present invention.

FIG. 10 is a flowchart illustrating logical printer creation processing called in step SC902 shown in FIG. 9. In step SC1000, processing by the job management service 403 is started. In step SC1001, the job management service 403 acquires the IP address of the multi-function peripheral 102 shown in FIG. 1. The IP address of the multi-function peripheral 102 has already been acquired when a data transmission/reception connection with the panel application 407 is established. In step SC1002, the job management service 403 determines whether or not a printer driver which supports the model name of the multi-function peripheral 102 shown in FIG. 1 has been installed in the print server 101. If no such printer driver has been installed, the process advances to step SC1003, and the job management service 403 installs a printer driver, which supports the model name of the multi-function peripheral 102 shown in FIG. 1, in the print server 101. Then, the process advances to step SC1004. If the job management service 403 determines in step SC1002 that such a printer driver has been installed, the process advances to step SC1004. At this stage, the installed printer driver corresponds to the printer driver 408 shown in FIG. 4.

In step SC1004, the job management service 403 determines whether or not a logical printer, which is constituted by the installed printer driver and has the IP address acquired in step SC1001 as an output port, exists in the print server 101. If no such logical printer exists, the process advances to step SC1005. In step SC1005, the job management service 403 generates a logical printer, which has the IP address acquired in step SC1001 as an output port, using the installed printer driver. Then, the process advances to step SC1006. On the other hand, if the job management service 403 determines in step SC1004 that such a logical printer exists, the process advances to step SC1006. The process is ended in step SC1006.

Figure 11:
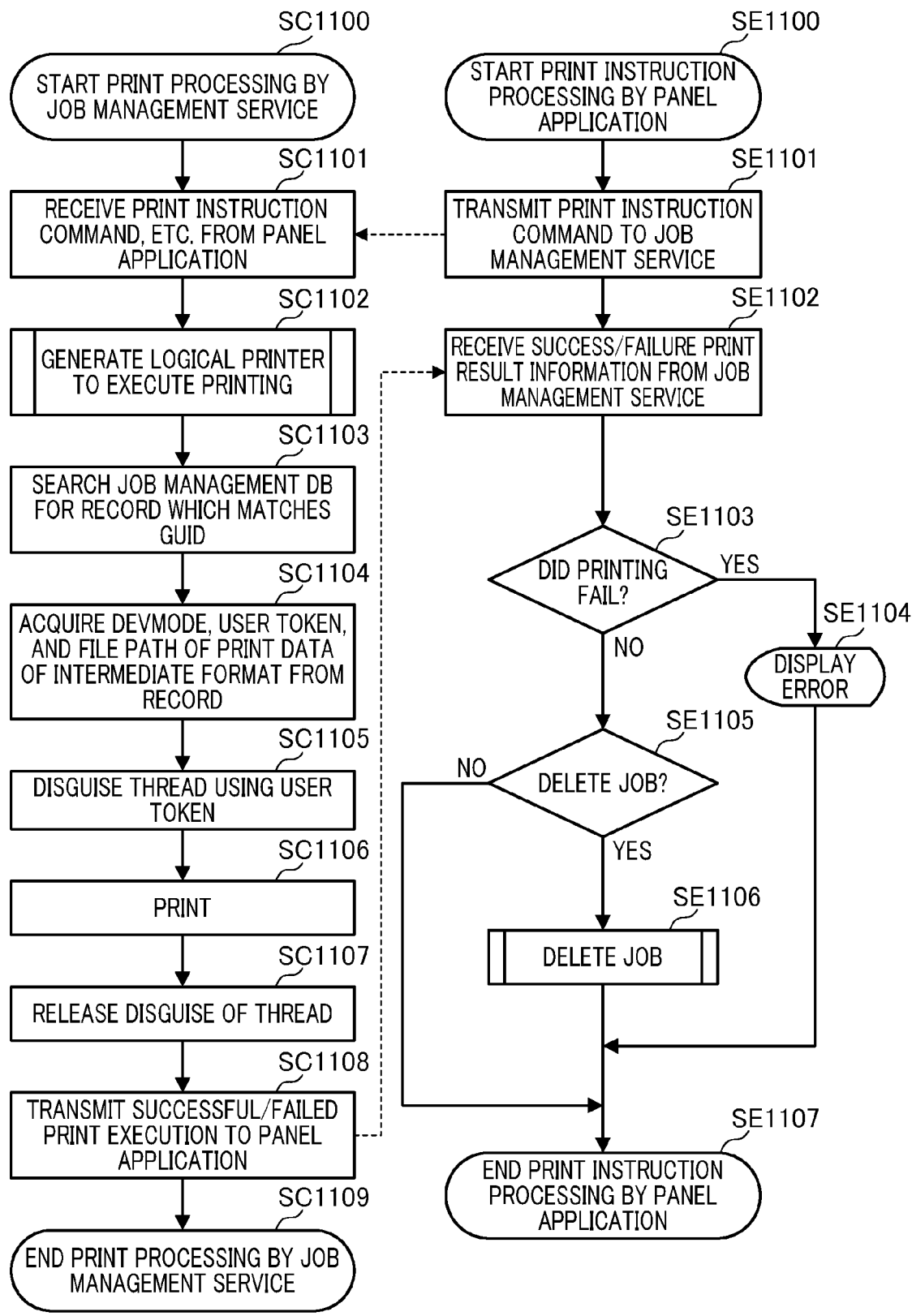
FIG. 11 is a flowchart illustrating an example of the fourth control processing procedure of the present invention.

FIG. 11 is a flowchart illustrating an example of the fourth control processing procedure in the printing system of the present invention, and is also a flowchart illustrating print instruction processing called in step SE911 shown in FIG. 9. This procedure corresponds to the processing procedure from 4-1 to 4-4 shown in FIG. 4. Steps SE1100 to SE1107 correspond to print instruction processing by the panel application 407 shown in FIG. 4. These flowchart processes are implemented by loading a program stored in the external memory into the RAM and executing the program by the CPU of the multi-function peripheral 102 shown in FIG. 1. Steps SC1100 to SC1109 correspond to print processing by the job management service 403 shown in FIG. 4. These flowchart processes are implemented by loading a program stored in the external memory into the RAM and executing the program by the CPU of the job management server 101 shown in FIG. 1.

Figure 14F:
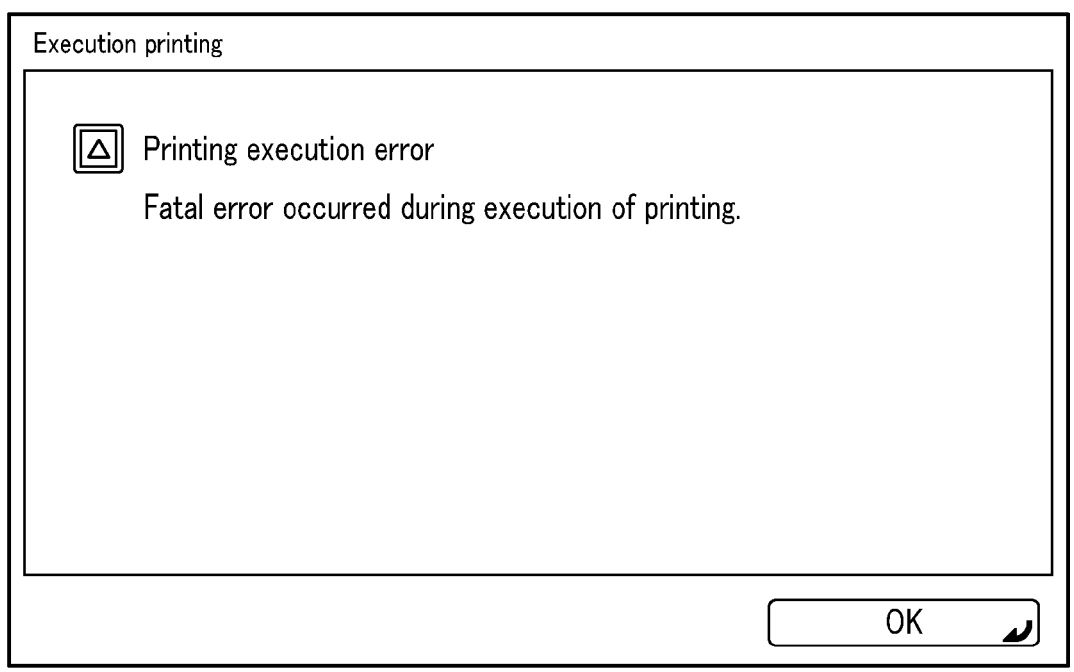
FIG. 14F is a schematic diagram illustrating a screen to be displayed on a display unit of an operation unit provided in a multi-function peripheral.

Firstly, a description will be given of print instruction processing by the panel application 407. In step SE1100, processing by the panel application 407 is started. In step SE1101, the panel application 407 transmits a print instruction request command to the job management service 403. At this time, the panel application 407 also transmits the GUID of a selected print job and the model name of the multi-function peripheral 102 to the job management service 403. In step SE1102, the panel application 407 receives a printing execution result (success/failure) from the job management service 403. In step SE1103, the panel application 407 determines whether or not execution of printing is successful. If execution of printing has failed, the process advances to step SE1104, and the panel application 407 displays an error display screen (FIG. 14F) on the display unit of the operation unit 308. Then, the process advances to step SE1107.

On the other hand, if the panel application 407 determines in step SE1103 that execution of printing is successful, the process advances to step SE1105. In step SE1105, the panel application 407 determines whether or not a printed document erase check box 1421 shown in FIG. 14C has been checked. If deletion after printing is designated, the process advances to step SE1106, and the panel application 407 deletes the print job. Details of this processing will be described below with reference to FIG. 12. Then, the process advances to step SE1107. The process is ended in step SE1107.

Next, a description will be given of print processing by the job management service 403. In step SC1100, processing by the job management service 403 is started. In step SC1101, the job management service 403 receives the print instruction command that have been transmitted from the panel application 407 in step SE1101. At this time, the job management service 403 also receives the GUID of the print job to be printed and the model name of the multi-function peripheral 102. In step SC1102, the job management service 403 creates a logical printer to change execution of printing. The processing contents are the same as those in step SC902 shown in FIG. 9. Details of this processing have been described with reference to FIG. 10.

In step SC1103, the job management service 403 searches the job management DB 404 shown in FIG. 4 for a record that matches the GUID received in step SC1101. In step SC1104, the job management service 403 acquires an EMFSPOOL file name, DEVMODE, and user token from the searched record. In step SC1105, the job management service 403 disguises its thread using the user token acquired in step SC1104. While the thread is disguised, the thread is executed in the security context of a user who executed printing using the client application 400 shown in FIG. 4.

In step SC1106, the job management service 403 executes print processing by rendering the EMFSPOOL and DEVMODE which have been acquired in step SC1104 for the logical printer created in step SC1102. The printer driver which constitutes a logical printer generates PDL and transmits it to the multi-function peripheral 102. The multi-function peripheral 102 executes print processing using the PDL that has been transmitted in step SC1106. In step SC1107, the job management service 403 releases the disguise of the thread. In step SC1108, the job management service 403 sends back a printing execution result (success/failure) to the panel application 407. The process is ended in step SC1109.

Figure 12:
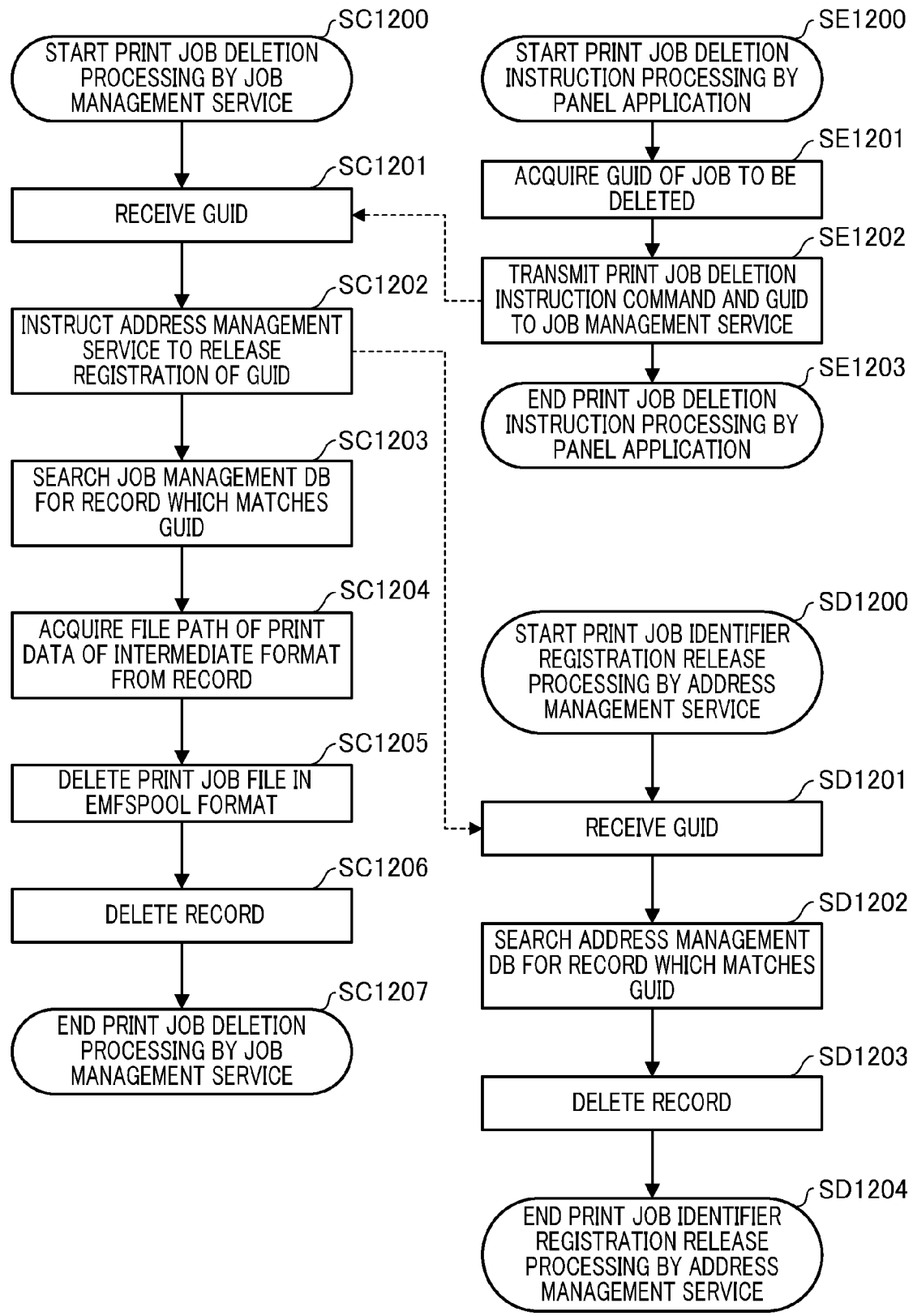
FIG. 12 is a flowchart illustrating an example of the fifth control processing procedure of the present invention.

FIG. 12 is a flowchart illustrating an example of the fifth control processing procedure in the printing system of the present invention. This procedure corresponds to the processing procedure from 5-1 to 5-4 shown in FIG. 4. Steps SE1200 to SE1203 correspond to print job deletion instruction processing by the panel application 407 shown in FIG. 4. These flowchart processes are implemented by loading a program stored in the external memory into the RAM and executing the program by the CPU of the multi-function peripheral 102 shown in FIG. 1. Steps SC1200 to SC1207 correspond to print job deletion processing by the job management service 403 shown in FIG. 4. These flowchart processes are implemented by loading a program stored in the external memory into the RAM and executing the program by the CPU of the job management server 101 shown in FIG. 1. Steps SD1200 to SD1204 correspond to print job identifier registration release processing by the address management service 405 shown in FIG. 4. These flowchart processes are implemented by loading a program stored in the external memory into the RAM and executing the program by the CPU of the address management server 103 shown in FIG. 1.

Firstly, a description will be given of print job deletion instruction processing by the panel application 407. In step SE1200, processing by the panel application 407 is started. As described above, step SE1200 is called in step SE1106 shown in FIG. 11. This step is also called when pressing of an erase button 1421 shown in FIG. 12C is received from the user. In step SE1201, the panel application 407 acquires the GUID of a print job to be deleted. In step SE1202, the panel application 407 transmits a print job deletion instruction command to the job management service 403. At this time, the panel application 407 also transmits the GUID acquired in step SE1201. The process is ended in step SE1203.

Next, a description will be given of print job deletion processing by the job management service 403. In step SC1200, processing by the job management service 403 is started. In step SC1201, the job management service 403 receives the print job deletion instruction command from the panel application 407 in step SE1202. At this time, the job management service 403 also receives the GUID of the print job to be deleted. In step SC1202, the job management service 403 transmits a print job identifier registration release command to the address management service 405. At this time, the job management service 403 also transmits the GUID received in step SC1201. In step SC1203, the job management service 403 searches the job management DB 404 shown in FIG. 4 for a record which matches the GUID received in step SC1201.

In step SC1204, the job management service 403 acquires an EMFSPOOL file name from the searched record. In step SC1205, the job management service 403 deletes the EMFSPOOL file. In step SC1206, the job management service 403 deletes the record obtained in step SC1203 from the job management DB 404 shown in FIG. 4. The process is ended in step SC1207.

Next, a description will be given of print job identifier registration release processing by the address management service 405. In step SD1200, processing by the address management service 405 is started. In step SD1201, the address management service 405 receives the print job identifier registration release command from the job management service 403 in step SC1202. At this time, the address management service 405 also receives the GUID serving as a target print job identifier. In step SD1202, the address management service 405 searches the address management DB 406 shown in FIG. 4 for a record which matches the GUID received in step SD1201. In step SD1203, the address management service 405 deletes the record obtained in step SD1202 from the job management DB 404 shown in FIG. 4. The process is ended in step SD1204.

Figure 15:
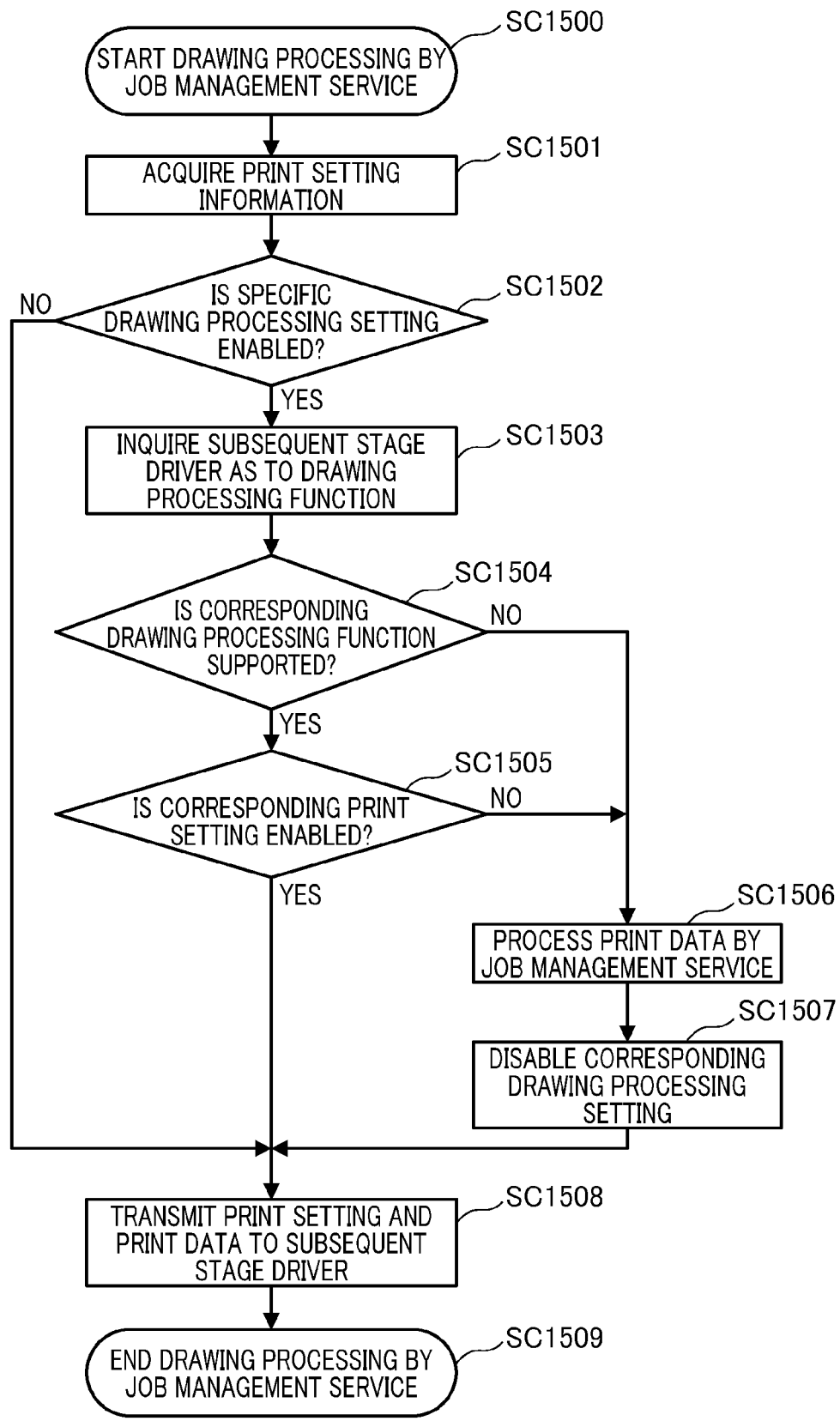
FIG. 15 is a flowchart illustrating an example of processing of a print job in an intermediate format.

FIG. 15 is a flowchart illustrating an example of the sixth control processing procedure in the printing system of the present invention. This procedure corresponds to the processing procedure from 4-2 to 4-5 shown in FIG. 4. Steps SC1500 to SC1509 correspond to print processing by the job management service 403 shown in FIG. 4. These flowchart processes are implemented by loading a program stored in the external memory into the RAM and executing the program by the CPU of the job management server 101 shown in FIG. 1. The control processing is performed when the function of the client application 400 is not supported by the printer driver 408 on the print server 101. More specifically, assume that there is a print function of expanding or reducing an original paper size set by the application 400 installed in the client in accordance with a sheet placed on the actual output printer 102. If the printer driver 408 of the print server 101 side supports the expansion/reduction print function, a print job in the EMFSPOOL format is simply transmitted to the printer driver 408 for printout. On the other hand, even if the printer driver 408 does not support the function, the pull print system of the present embodiment performs processing for avoiding data output with the original paper size without performing expansion/reduction print processing. Furthermore, even if the printer driver 408 supports the expansion/reduction print function itself but does not support the sheet to be expanded or reduced, the pull print system of the present embodiment can correctly operate the expansion/reduction print function. Note that the following control processing is performed by the job management service 403 on the print server 101. However, the present invention is not particularly limited thereto.

Firstly, upon receiving a print request signal from the panel application 407, the job management service 403 acquires a corresponding print job in the EMFSPOOL format from the job management DB 404. After acquisition of the print job in the EMFSPOOL format, the job management service 403 acquires print setting information, which has been set by the application 400 or the virtual printer driver 401 installed in the client PC 100, from the print job in step SC1501. Furthermore, the job management service 403 determines in step SC1502 whether or not the setting of the items regarding drawing processing particularly among the acquired print settings is enabled.

If the setting of the items regarding drawing processing is enabled in step SC1502, the job management service 403 activates the actual output printer driver 408 in step SC1503. Then, the job management service 403 (function determining unit) inquires as to whether or not the function of the items regarding drawing processing is supported. As an inquiry method, the API for Windows (registered trademark) is typically used to inquire whether or not the corresponding function is enabled, but a specially prepared I/F may also be used for inquiry depending on a printer driver. If such I/F is not provided, it may be determined that the function is not supported.

If it has been found as a result of inquiry in step SC1504 that the printer driver 408 does not support the function, the job management service 403 (processing unit) processes a print job in the EMFSPOOL format in step SC1506. On the other hand, if the printer driver 408 supports the function in step SC1504, the job management service 403 (setting determining unit) determines in step SC1505 whether or not the print setting corresponding to the function is enabled. If the print setting corresponding to the function is disabled in step SC1505, the process advances to step SC1506 and the job management service 403 processes the print job in the EMFSPOOL format. On the other hand, if the print setting corresponding to the function is found to be enabled in step SC1505, the process advances to step SC1508. The job management service 403 determines whether or not the print setting has been enabled in step SC1505 in the same fashion as the inquiry of the function in step SC1503. For example, the API for Windows (registered trademark) may be used to inquire whether or not the print setting is enabled or a specially prepared I/F may be used for inquiry depending on a printer driver.

Next, a specific description will be given of processing of a print job in the EMFSPOOL format by the job management service 403 in step SC1506. The job management service 403 acquires the function set in the virtual printer driver 401, and processes a print job in the EMFSPOOL format in response to the function. For example, if the monochrome print setting is enabled and a print job in the EMFSPOOL format is color data, the job management service 403 binarizes a print job in the EMFSPOOL format and converts it into monochrome data. If the page integration print setting is enabled, the job management service 403 performs reduction processing for each page in response to the assignment number or the assignment method, and assigns pages to appropriate positions of a sheet. If the expansion/reduction print setting is enabled, the job management service 403 converts raw data size into an appropriate size in response to an output sheet. In a second embodiment, a detailed description will be given of processing regarding the expansion/reduction print function.

When a print job in the EMFSPOOL format has been processed to completion in step SC1506, the job management service 403 disables a corresponding setting of the print settings to be transmitted to the printer driver 408 installed in the print server 101 in step SC1507. In step SC1508, the job management service 403 transmits the processed print job in the EMFSPOOL format and the print settings in which the corresponding setting has been disabled to the printer driver 408 installed in the print server 101 and instructs the printer driver 408 to perform print processing.

According to the present embodiment, if the printer driver 408 serving as the output destination does not support a drawing-relevant print function, the job management service 403 processes a print job in the EMFSPOOL format on behalf of the printer driver 408. Thus, the print result intended by the user can be provided regardless of presence/absence of the function provided in the printer driver serving as the output destination. On the other hand, if the printer driver 408 installed in the print server 101 supports the function, the job management service 403 does not process a print job in the EMFSPOOL format. In this manner, each printer driver is responsible for drawing processing, and thus, the print result finely reflecting the settings of each printer driver can be provided. For example, each printer has a different printable region. By making each printer driver responsible for drawing processing, drawing processing can be performed while taking a printable region for each printer into consideration. Note that the virtual printer driver 401 may have the function (referred to as the "forced monochrome function") of printing all print jobs in the EMFSPOOL format in monochrome and the printer driver 408 installed in the print server 101 may not have the function. Even in this case, the job management service 403 processes a print job in the EMFSPOOL format in monochrome and transmits the processed print job to the printer driver 408. In this manner, a colored document may forcibly be output in monochrome.

As described above, according to the present embodiment, the job management service 403 directly processes a print job in the EMFSPOOL format. Thus, printing can be performed using print setting information expected by a user regardless of presence/absence of the function supported by the printer driver installed on the print server. In particular, even when an actual output printer driver does not support the print setting function regarding drawing processing set on a client PC by a user, the print result desired by the user can be provided.

Second Embodiment

Next, a description will be given of a printing system according to a second embodiment of the present invention. The printing system in the second embodiment has the same configuration as that of the printing system in the first embodiment shown in FIG. 1, and includes a client PC, a print server (printing control device), an address management server, and a printing apparatus. The printing system of the second embodiment includes special processing when a specific drawing process is a color/monochrome print function or an integration print function. More specifically, special processing includes processing of a print job in the EMFSPOOL format as well as processing of a print job in the EMFSPOOL format when the specific drawing process is the expansion/reduction print function.

Figure 16:
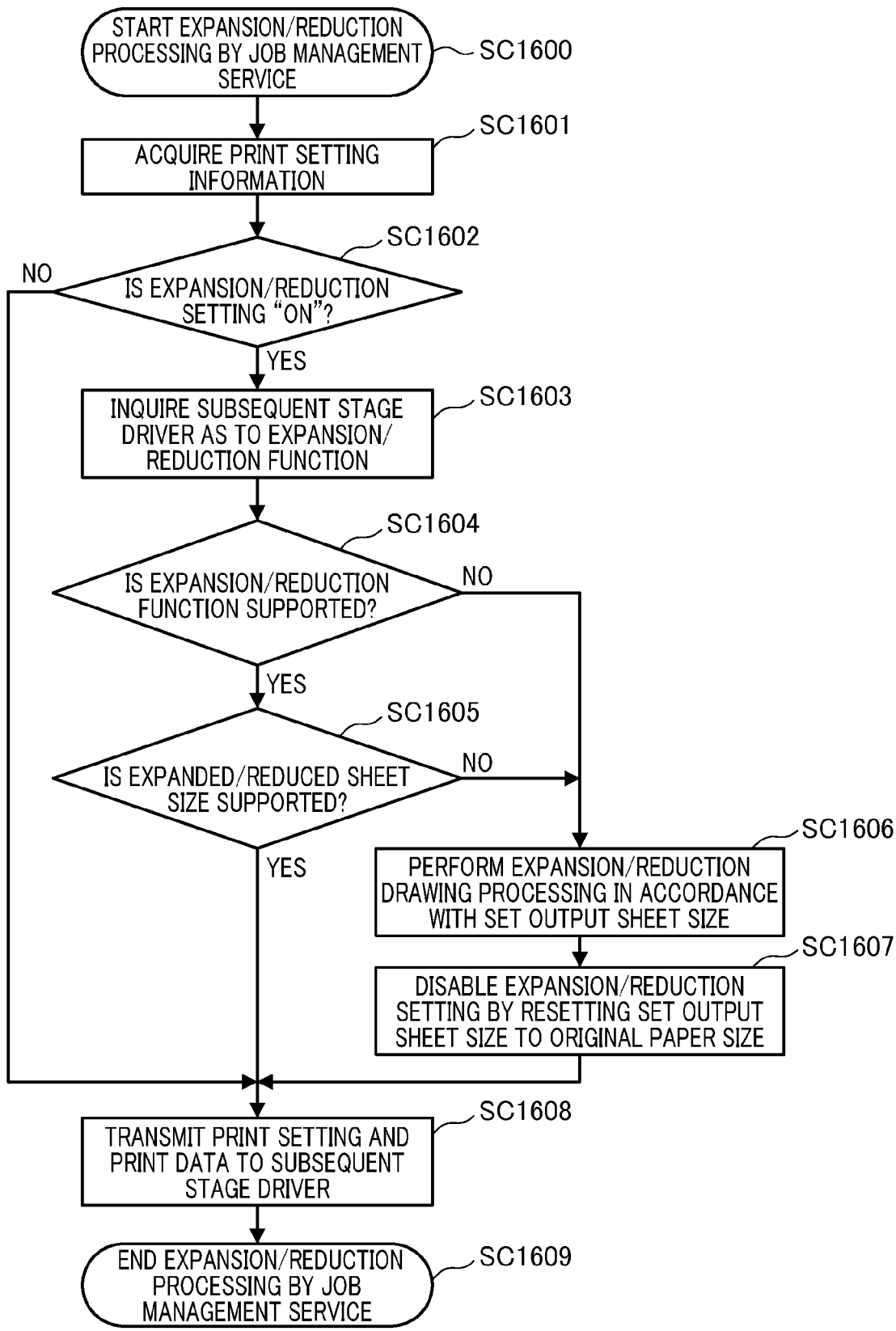
FIG. 16 is a flowchart illustrating an example of processing for expanding/reducing a print job in an intermediate format.

FIG. 16 is a flowchart illustrating an example of the seventh control processing procedure in the printing system of the present invention. This procedure corresponds to the processing procedure from 4-2 to 4-5 shown in FIG. 4. Steps SC1600 to SC1609 correspond to print processing by the job management service 403 shown in FIG. 4. These flowchart processes are implemented by loading a program stored in the external memory into the RAM and executing the program by the CPU of the job management server 101 shown in FIG. 1. The control processing is processing of a print job in the EMFSPOOL format when the specific drawing process is the expansion/reduction print function. The processes in steps SC1600 to SC1604 are the same as those in steps SC1500 to SC1504 in the first embodiment, and thus, a detailed description thereof will be omitted.

In step SC1604, the job management service 403 determines whether or not the printer driver 408 installed in the print server 101 serving as the output destination supports the expansion/reduction print function. If the printer driver 408 supports the expansion/reduction print function, the job management service 403 inquires the printer driver 408 in step SC1605 as to whether or not a sheet to be actually output is supported. As described in the first embodiment, the API for Windows (registered trademark) may be used for inquiry or a specially prepared I/F may be used for inquiry depending on a printer driver. A specific inquiry method will be described below. Firstly, the job management service 403 acquires print setting information stored in the corresponding print job in the EMFSPOOL format, and acquires the output paper size subjected to expansion/reduction processing from the information. The job management service passes the acquired output paper size to a printer driver using the aforementioned I/F to inquire the printer driver as to whether or not expansion/reduction processing can be performed. The returned value from the I/F indicates whether or not expansion/reduction processing can be performed. If the value is "Yes", the job management service 403 determines that the corresponding paper size is supported, whereas if the value is "No", the job management service 403 determines that the corresponding paper size is not supported (SC1605).

If the printer driver 408 does not support the sheet as a result of inquiry in step SC1605 or if the printer driver 408 does not support the expansion/reduction print function in step SC1604, the process advances to step SC1606. In step SC1606, the job management service 403 processes drawing data for a print job in the EMFSPOOL format so as to expand or reduce it to the output paper size.

When the job management service 403 performs expansion/reduction processing, the job management service 403 performs drawing area calculation processing. The calculation processing differs depending on whether a sheet is in a standard paper size or a non-standard paper size. A standard paper size refers to a paper size pre-defined in the OS or driver. A non-standard paper size refers to a paper size independently registered in the OS by a user, a paper size internally defined by other printer drivers, or the like. A non-standard paper size refers to any paper size other than a standard paper size. For example, a non-standard paper size refers to a paper size which is not designated by the paper size ID (A4, letter, or the like) but is designated only by the width/height of a sheet during printing. A non-standard paper size also refers to a paper size designated by the ID for an intentional presentation (the numeral value "256" for Windows (registered trademark) available from Microsoft Corporation). If the output paper size is a standard paper size, the job management service 403 (sheet determining unit) calculates a drawing area from the paper ID using the internally defined numeral values for the width/height of a drawing area or the numeral values for the width/height of a paper size registered in the OS. If the output paper size is a non-standard paper size, the job management service 403 acquires the width/height of the sheet expanded/reduced from the print settings and calculates a drawing area to be expanded or reduced.

In step SC1606, the job management service 403 processes drawing data for a print job in the EMFSPOOL format so as to expand or reduce it with respect to the calculated drawing area. Next, in step SC1607, the job management service 403 disables the corresponding item in print setting information. More specifically, the job management service 403 sets the value of the output paper size subjected to expansion/reduction processing to the item for the original paper size in the acquired print setting information to thereby disable the corresponding item in print setting information. Here, the value which is not subjected to expansion/reduction processing (e.g. "same as original paper size" set value) is set to the item for setting the output paper size in print setting information. On the other hand, if the output paper size subjected to expansion/reduction processing is a non-standard paper size, the job management service 403 sets a non-standard paper size to the original paper size in the acquired print setting information and also sets the width/height of a sheet simultaneously. The processes in steps SC1608 and SC1609 are the same as those in steps SC1508 and SC1509 in the first embodiment, and thus, a detailed description thereof will be omitted.

According to the second embodiment, the printer driver 408 installed in the print server 101 which has received a print instruction creates print data (PDL data) in the paper size set in the item for the original paper size in print setting information without performing processing regarding expansion/reduction settings. In this manner, print data subjected to expansion/reduction processing desired by a user is output. Note that the output paper size may be forcibly designated. The typical client application 400 often holds data relating to the original paper size. It is inefficient to change the original paper size for each client application 400. Thus, the output paper size is forcibly designated, resulting in an efficient output of print data.

Third Embodiment

In the processes described in the second embodiment, a non-standard paper size is set to the original paper size in print settings to be transmitted to the actual output printer driver 408 so as to perform print data transmission if the printer driver 408 does not support the expansion/reduction print function. In the third embodiment, printing can still be made even if there is a function (two-sided printing or the like) not available for a non-standard paper size. In the third embodiment, the processes in steps SC1600 to SC1605 are the same as those described in the second embodiment, and thus, a detailed description thereof will be omitted.

If the printer driver 408 does not support the expansion/reduction print function in step SC1604, the job management service 403 performs processing for expanding or reducing a print job in the EMFSPOOL format in step SC1606. Next, the job management service 403 acquires a list of supported paper sizes from the actual output printer driver 408. The job management service 403 determines whether or not there is an expanded or reduced paper size among the acquired list of paper sizes. If the expanded or reduced paper size is on the list, the job management service 403 determines that the printer driver 408 supports the paper size. Then, in step SC1608, the paper size ID is set to the item for the original paper size in print settings and is transmitted to the printer driver 408. The processes in steps SC1608 and SC1609 are the same as those described in the second embodiment, and thus, a detailed description thereof will be omitted.

According to the third embodiment, a print setting in which a standard paper size is set is transmitted to the printer driver 408 called by the job management service 403, and thus, a function not available for a non-standard paper size such as a two-sided print function may be provided.

Fourth Embodiment

While, in the first embodiment, the foregoing description has been made on the assumption that a server PC is provided and operated in a company, as described in the example in which the print server 101 is "provided for each floor of the business office A", the server may also be an external server utilizing a cloud computing service. In this case, the virtual printer driver 401 of the client PC 100 transmits a print job in an intermediate format to the external server. Also, the pull printing device 102 receives the PDL job, which has been generated based on the corresponding print job in the intermediate format, from the external server. The transmission and reception method is not distinguished from the method for transmitting/receiving a print job to/from an internal server. However, when communication is established between a pull printing device and an external server, it is necessary to pay attention to the aspects of fault and security in regard to network traffic. For example, when a print job is transmitted/received to/from an external server, the size of the print job needs to be reduced for the purpose of reducing a network load. Such a reduction may be realized by the compression of a print job or distributed print job processing. For the aspects of security, the content of a print job may leak to the external network. In order to avoid such leakage, a print job may be encrypted. A pull printing system utilizing an external server can be implemented by solving these faults. The internal processing of the server 101 is the same as that in the first embodiment.

According to the fourth embodiment, there is no need to prepare a separate pull printing server PC(s) in a company or business office(s). Also, the necessity of maintenance of a server PC(s) is eliminated.

Other Embodiments

Aspects of the present invention can also be implemented by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-171249 filed Aug. 4, 2011, and Japanese Patent Application No. 2011-225543 filed on Oct. 13, 2011, which are hereby incorporated by reference herein in its entirety.

What is claimed is:

1. A printing control device including a driver for generating print data based on a print job in an intermediate format in which print setting information is set, the printing control device comprising:
   a function determining unit configured to determine whether or not the driver supports a predetermined function among the print setting information;
   a transmission unit configured to transmit the print job in the intermediate format to the driver to cause the driver to execute the predetermined function if the function determining unit determines that the driver supports the predetermined function;
   a processing unit configured to execute, before the print job is transmitted to the driver, the predetermined function so that a drawing processing is performed to a drawing data of the print job according to a print setting corresponding to the predetermined function in the print setting information included in the print job if the function determining unit determines that the driver does not support the predetermined function; and
   a disabling unit configured to disable a print setting corresponding to the predetermined function of the driver when the processing unit processes the print job in the intermediate format,
   wherein the transmission unit transmits, to the driver, the print job to which the print setting corresponding to the predetermined function is disabled by the disabling unit.

2. The printing control device according to claim 1, further comprising:
   a setting determining unit configured to determine whether or not a print setting corresponding to the predetermined function of the driver is enabled,
   wherein, if the setting determining unit determines that the print setting is disabled, the processing unit processes the print job in the intermediate format with respect to the predetermined function.

3. The printing control device according to claim 1, wherein, if the predetermined function is an expansion/reduction print function, the processing unit calculates drawing area by means of different processing based on the fact that a print paper sheet is a standard paper size or any other paper size.

4. The printing control device according to claim 1, further comprising:
   a sheet determining unit configured to determine whether or not the driver supports an expanded size or a reduced size of a sheet if the predetermined function is an expansion/reduction print function,
   wherein, if the driver does not support the expanded size or the reduced size of the sheet, the processing unit performs processing for expanding or reducing drawing data of the print job in the intermediate format.

5. The printing control device according to claim 1, wherein the predetermined function is any one of a color/monochrome print function, an integration print function, or an expansion/reduction print function.

6. A printing control method for a printing control device including a driver for generating print data based on a print job in an intermediate format in which print setting information is set, the method comprising:
   determining, whether or not the driver supports a predetermined function among the print setting information;
   transmitting the print job in the intermediate format to the driver to cause the driver to execute the predetermined function if the function determining unit determines that the driver supports the predetermined function;
   executing, before the print job is transmitted to the driver, the predetermined function so that a drawing processing is performed to a drawing data of the print job according to a print setting corresponding to the predetermined function in the print setting information included in the print job if it is determined that the driver does not support the predetermined function; and
   disabling a print setting corresponding to the predetermined function of the driver when the print job in the intermediate format is processed,
   wherein, in the transmitting, the print job to which the print setting corresponding to the predetermined function is disabled in the disabling is transmitted to the driver.

7. The method according to claim 6 further comprising:
   determining, whether or not a print setting corresponding to the predetermined function of the driver is enabled,
   wherein, if it is determined that the print setting is disabled, the print job in the intermediate format is processed with respect to the predetermined function.

8. The method according to claim 6, wherein, if the predetermined function is an expansion/reduction print function, a drawing area is calculated by means of different processing based on the fact that a print paper sheet is a standard paper size or any other paper size.

9. The method according to claim 6 further comprising:
   determining, whether or not the driver supports an expanded size or a reduced size of a sheet if the predetermined function is an expansion/reduction print function, wherein, if the driver does not support the expanded size or the reduced size of the sheet, processing for expanding or reducing drawing data of the print job in the intermediate format is performed.

10. The method according to claim 6, wherein the predetermined function is any one of a color/monochrome print function, an integration print function or an expansion/reduction print function.

11. A non-transitory storage medium storing a printing control program for making a computer including a driver for generating print data based on a print job in an intermediate format in which print setting information is set, comprising:
- determining, whether or not the driver supports a predetermined function among the print setting information;
- transmitting the print job in the intermediate format to the driver to cause the driver to execute the predetermined function if the function determining unit determines that the driver supports the predetermined function;
- executing, before the print job is transmitted to the driver, the predetermined function so that a drawing processing is performed to a drawing data of the print job according to a print setting corresponding to the predetermined function in the print setting information included in the print job if it is determined that the driver does not support the predetermined function; and
- disabling a print setting corresponding to the predetermined function of the driver when the print job in the intermediate format is processed,
- wherein, in the transmitting, the print job to which the print setting corresponding to the predetermined function is disabled in the disabling is transmitted to the driver.

* * * * *